United States Patent
Ciftcioglu et al.

(10) Patent No.: US 12,245,149 B2
(45) Date of Patent: *Mar. 4, 2025

(54) TECHNIQUES FOR DISCONTINUOUS RECEPTION CYCLE BASED MEASUREMENT GAPS

(71) Applicant: QUALCOMM Incorporated, San Diego, CA (US)

(72) Inventors: Ertugrul Necdet Ciftcioglu, North Reading, MA (US); Brian Clarke Banister, San Diego, CA (US); Arvind Vardarajan Santhanam, San Diego, CA (US); Sumit Kumar Singh, San Marcos, CA (US); Bhupesh Manoharlal Umatt, Poway, CA (US); Himanshu Dutta, San Diego, CA (US); Preeti Sivakumar, San Diego, CA (US); Vishal Hingorani, San Diego, CA (US); Prem Swaroop Kadavakuduru, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,711

(22) Filed: Mar. 30, 2023

(65) Prior Publication Data

US 2023/0247551 A1 Aug. 3, 2023

Related U.S. Application Data

(63) Continuation of application No. 17/190,617, filed on Mar. 3, 2021, now Pat. No. 11,622,328.

(Continued)

(51) Int. Cl.
*H04W 52/02* (2009.01)
*H04W 24/10* (2009.01)

(Continued)

(52) U.S. Cl.
CPC ....... *H04W 52/0216* (2013.01); *H04W 24/10* (2013.01); *H04W 76/16* (2018.02); *H04W 76/28* (2018.02)

(58) Field of Classification Search
None
See application file for complete search history.

(56) References Cited

U.S. PATENT DOCUMENTS 8,451,803 B2 5/2013 Kitazoe
9,521,596 B2 12/2016 Wei et al.
(Continued)

FOREIGN PATENT DOCUMENTS

WO 2013168966 A1 11/2013
WO 2018213120 11/2018

OTHER PUBLICATIONS

International Search Report and Written Opinion—PCT/US2021/035581—ISA/EPO—Sep. 24, 2021.

*Primary Examiner* — Walter J Divito
(74) *Attorney, Agent, or Firm* — Dalei Dong; Harrity & Harrity, LLP

(57) ABSTRACT

Various aspects of the present disclosure generally relate to wireless communication. In some aspects, a user equipment may establish a communication connection with a serving cell associated with a first discontinuous reception (DRX) cycle configuration, determine, based at least in part on at least one of a first on duration of a first DRX cycle indicated by the first DRX cycle configuration or a type of traffic of one or more communications received during the first DRX cycle, an autonomous measurement gap associated with a neighboring cell, and perform a measurement of the neighboring cell during the autonomous measurement gap. Numerous other aspects are provided.

20 Claims, 7 Drawing Sheets

Related U.S. Application Data

(60) Provisional application No. 63/047,738, filed on Jul. 2, 2020.

(51) Int. Cl.
*H04W 76/16* (2018.01)
*H04W 76/28* (2018.01)

(56) References Cited

U.S. PATENT DOCUMENTS

| | | |
|---|---|---|
| 9,949,183 B2 | 4/2018 | Axmon et al. |
| 9,967,817 B2 | 5/2018 | Yang et al. |
| 2011/0105122 A1 | 5/2011 | Wu |
| 2016/0014691 A1 | 1/2016 | Rastogi |
| 2016/0081021 A1 | 3/2016 | Abdel-Samad et al. |
| 2020/0413460 A1 | 12/2020 | Tang et al. |
| 2022/0007286 A1 | 1/2022 | Ciftcioglu |

TECHNIQUES FOR DISCONTINUOUS RECEPTION CYCLE BASED MEASUREMENT GAPS

CROSS-REFERENCE TO RELATED APPLICATION

This is a continuation of U.S. patent application Ser. No. 17/190,617, filed on Mar. 3, 2021, entitled "TECHNIQUES FOR DISCONTINUOUS RECEPTION CYCLE BASED MEASUREMENT GAPS" (now U.S. Pat. No. 11,622,328), which claims priority to U.S. Provisional Patent Application No. 63/047,738, filed on Jul. 2, 2020, entitled "TECHNIQUES FOR DISCONTINUOUS RECEPTION CYCLE BASED MEASUREMENT GAPS," the contents of which are incorporated herein by reference in their entireties.

FIELD OF THE DISCLOSURE

Aspects of the present disclosure generally relate to wireless communication and to techniques and apparatuses for discontinuous reception (DRX) cycle based measurement gaps.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: establishing a communication connection with a serving cell associated with a first discontinuous reception (DRX) cycle configuration; determining, based at least in part on at least one of a first on duration of a first DRX cycle indicated by the first DRX cycle configuration or a type of traffic of one or more communications received during the first DRX cycle, an autonomous measurement gap associated with a neighboring cell; and performing a measurement of the neighboring cell during the autonomous measurement gap.

In some aspects, the serving cell includes a first serving cell associated with the first DRX cycle configuration and a second serving cell associated with a second DRX cycle configuration, and determining the autonomous measurement gap associated with the neighboring cell, comprises: determining, based at least in part on the first on duration of the first DRX cycle indicated by the first DRX cycle configuration and a second on duration of a second DRX cycle indicated by the second DRX cycle configuration, the autonomous measurement gap associated with the neighboring cell.

In some aspects, the first serving cell is associated with a first radio access technology (RAT) and the second serving cell is associated with a second RAT.

In some aspects, the serving cell is associated with a first RAT and the neighboring cell is associated with a second RAT.

In some aspects, determining the autonomous measurement gap associated with the neighboring cell, comprises: initiating a timer at an end of the first on duration of the first DRX cycle; and determining the autonomous measurement gap based at least in part on determining that: the timer has expired, or the UE has transitioned from an active state of the first DRX cycle to an inactive state of the first DRX cycle.

In some aspects, the method includes determining an amount of time associated with the timer based at least in part on the first DRX cycle configuration.

In some aspects, the method includes determining an amount of time associated with the timer based at least in part on at least one of: a DRX cycle length indicated by the first DRX cycle configuration, or an inactivity timer indicated by the first DRX cycle configuration.

In some aspects, the method includes determining an amount of time associated with the timer based at least in part on the type of traffic of one or more communications received during the first DRX cycle.

In some aspects, the method includes identifying historical data associated with an amount of time between a start of the on duration of the first DRX cycle and the UE transitioning from the active state of the first DRX cycle to the inactive state of the first DRX cycle; and determining an amount of time associated with the timer based at least in part on the historical data associated with the amount of time between the start of the on duration of the first DRX cycle and the UE transitioning from the active state of the first DRX cycle to the inactive state of the first DRX cycle.

In some aspects, the method includes determining an amount of time associated with the timer; and reducing the amount of time associated with the timer based at least in part on at least one of: determining that a length of the autonomous measurement gap is less than a threshold, determining that a display of the UE is off and one or more communications received during the first DRX cycle are associated with traffic that is delay tolerant, or determining that one or more previous measurements of the neighboring cell satisfy a measurement threshold.

In some aspects, the method includes determining an amount of time associated with the timer; and increasing the amount of time associated with the timer based at least in part on at least one of: determining that one or more communications received during the first DRX cycle are associated with traffic that is not delay tolerant, determining that the UE is not located within a coverage area associated with the neighboring cell, or determining that previous measurements of the neighboring cell do not satisfy a measurement threshold.

In some aspects, determining the autonomous measurement gap associated with the neighboring cell comprises: determining that a plurality of autonomous measurement gaps are to occur during the first DRX cycle; and determining an amount of time associated with the timer based at least in part on the determination that a plurality of autonomous measurement gaps are to occur during the first DRX cycle.

In some aspects, the method includes receiving, from the serving cell, a second DRX cycle configuration, and determining the autonomous measurement gap associated with the neighboring cell comprises determining an amount of time associated with the timer based at least in part on at least one of: the first DRX cycle configuration, the second DRX cycle configuration, or a combination thereof.

In some aspects, the first DRX cycle configuration is associated with a first RAT and the second DRX cycle configuration is associated with a second RAT.

In some aspects, the method includes determining that a communication received during the first DRX cycle is associated with traffic that is not delay tolerant; and determining that the autonomous measurement gap associated with the neighboring cell is to occur during an inactive state of the first DRX cycle.

In some aspects, the method includes determining that a communication received during the first DRX cycle is associated with traffic that is not delay tolerant, and determining that a communication associated with traffic that is not delay tolerant is not to be received until a next DRX cycle; and determining the autonomous measurement gap associated with the neighboring cell comprises determining that the autonomous measurement gap associated with the neighboring cell is to occur after the communication received during the first DRX cycle that is associated with traffic that is not delay tolerant.

In some aspects, determining that a communication associated with traffic that is not delay tolerant is not to be received until a next DRX cycle comprises: identifying historical data associated with receiving communications associated with traffic that is not delay tolerant; and determining an average amount of time between receiving communications associated with traffic that is not delay tolerant.

In some aspects, the traffic that is not delay tolerant is at least one of: voice traffic, streaming traffic, gaming traffic, extended reality traffic, or virtual reality traffic.

In some aspects, the UE is operating in at least one of: a Long Term Evolution (LTE) mode, an Evolved Universal Mobile Telecommunications System Terrestrial Radio Access-New Radio (NR) dual connectivity mode, an NR standalone mode, or an NR dual connectivity mode.

In some aspects, the method includes receiving, from the serving cell, a measurement configuration indicating a measurement frequency; and determining that the neighboring cell is operating using the measurement frequency.

In some aspects, a UE for wireless communication includes: a memory and one or more processors coupled to the memory, the memory and the one or more processors configured to: establish a communication connection with a serving cell associated with a first DRX cycle configuration; determine, based at least in part on at least one of a first on duration of a first DRX cycle indicated by the first DRX cycle configuration or a type of traffic of one or more communications received during the first DRX cycle, an autonomous measurement gap associated with a neighboring cell; and perform a measurement of the neighboring cell during the autonomous measurement gap.

In some aspects, the serving cell includes a first serving cell associated with the first DRX cycle configuration and a second serving cell associated with a second DRX cycle configuration, and the one or more processors, when determining the autonomous measurement gap associated with the neighboring cell, are configured to: determine, based at least in part on the first on duration of the first DRX cycle indicated by the first DRX cycle configuration and a second on duration of a second DRX cycle indicated by the second DRX cycle configuration, the autonomous measurement gap associated with the neighboring cell.

In some aspects, the first serving cell is associated with a first RAT and the second serving cell is associated with a second RAT.

In some aspects, the serving cell is associated with a first RAT and the neighboring cell is associated with a second RAT.

In some aspects, the one or more processors, when determining the autonomous measurement gap associated with the neighboring cell, are configured to: initiate a timer at an end of the first on duration of the first DRX cycle; and determine the autonomous measurement gap based at least in part on determining that: the timer has expired, or the UE has transitioned from an active state of the first DRX cycle to an inactive state of the first DRX cycle.

In some aspects, the one or more processors are further configured to determine an amount of time associated with the timer based at least in part on the first DRX cycle configuration.

In some aspects, the one or more processors are further configured to: determine an amount of time associated with the timer based at least in part on at least one of: a DRX cycle length indicated by the first DRX cycle configuration, or an inactivity timer indicated by the first DRX cycle configuration.

In some aspects, the one or more processors are further configured to determine an amount of time associated with the timer based at least in part on the type of traffic of one or more communications received during the first DRX cycle.

In some aspects, the one or more processors are further configured to: identify historical data associated with an amount of time between a start of the on duration of the first DRX cycle and the UE transitioning from the active state of the first DRX cycle to the inactive state of the first DRX cycle; and determine an amount of time associated with the timer based at least in part on the historical data associated with the amount of time between the start of the on duration of the first DRX cycle and the UE transitioning from the active state of the first DRX cycle to the inactive state of the first DRX cycle.

In some aspects, the one or more processors are further configured to: determine an amount of time associated with the timer; and reduce the amount of time associated with the timer based at least in part on at least one of: determining that a length of the autonomous measurement gap is less than a threshold, determining that a display of the UE is off and one or more communications received during the first DRX cycle are associated with traffic that is delay tolerant, or determining that one or more previous measurements of the neighboring cell satisfy a measurement threshold.

In some aspects, the one or more processors are further configured to: determine an amount of time associated with the timer; and increase the amount of time associated with the timer based at least in part on at least one of: determining that one or more communications received during the first DRX cycle are associated with traffic that is not delay tolerant, determining that the UE is not located within a coverage area associated with the neighboring cell, or determining that previous measurements of the neighboring cell do not satisfy a measurement threshold.

In some aspects, the one or more processors, when determining the autonomous measurement gap associated with the neighboring cell, are configured to: determine that a plurality of autonomous measurement gaps are to occur during the first DRX cycle; and determine an amount of time associated with the timer based at least in part on the determination that a plurality of autonomous measurement gaps are to occur during the first DRX cycle.

In some aspects, the one or more processors are further configured to: receive, from the serving cell, a second DRX cycle configuration, wherein the one or more processors, when determining the autonomous measurement gap associated with the neighboring cell, are configured to: determine an amount of time associated with the timer based at least in part on at least one of: the first DRX cycle configuration, the second DRX cycle configuration, or a combination thereof.

In some aspects, the first DRX cycle configuration is associated with a first RAT and the second DRX cycle configuration is associated with a second RAT.

In some aspects, the one or more processors are further configured to: determine that a communication received during the first DRX cycle is associated with traffic that is not delay tolerant, wherein the one or more processors, when determining the autonomous measurement gap associated with the neighboring cell, are configured to determine that the autonomous measurement gap associated with the neighboring cell is to occur during an inactive state of the first DRX cycle.

In some aspects, the one or more processors are further configured to: determine that a communication received during the first DRX cycle is associated with traffic that is not delay tolerant; and determine that a communication associated with traffic that is not delay tolerant is not to be received until a next DRX cycle, wherein the one or more processors, when determining the autonomous measurement gap associated with the neighboring cell, are configured to determine that the autonomous measurement gap associated with the neighboring cell is to occur after the communication received during the first DRX cycle that is associated with traffic that is not delay tolerant.

In some aspects, the one or more processors, when determining that a communication associated with traffic that is not delay tolerant is not to be received until a next DRX cycle, are configured to: identify historical data associated with receiving communications associated with traffic that is not delay tolerant; and determine an average amount of time between receiving communications associated with traffic that is not delay tolerant.

In some aspects, the traffic that is not delay tolerant is at least one of: voice traffic, streaming traffic, gaming traffic, extended reality traffic, or virtual reality traffic.

In some aspects, the UE is operating in at least one of: an LTE mode, an Evolved Universal Mobile Telecommunications System Terrestrial Radio Access-NR dual connectivity mode, an NR standalone mode, or an NR dual connectivity mode.

In some aspects, the one or more processors are further configured to: receive, from the serving cell, a measurement configuration indicating a measurement frequency; and determine that the neighboring cell is operating using the measurement frequency.

In some aspects, a non-transitory computer-readable medium storing a set of instructions for wireless communication includes one or more instructions that, when executed by one or more processors of a UE, cause the UE to: establish a communication connection with a serving cell associated with a first DRX cycle configuration; determine, based at least in part on at least one of a first on duration of a first DRX cycle indicated by the first DRX cycle configuration or a type of traffic of one or more communications received during the first DRX cycle, an autonomous measurement gap associated with a neighboring cell; and perform a measurement of the neighboring cell during the autonomous measurement gap.

In some aspects, the serving cell includes a first serving cell associated with the first DRX cycle configuration and a second serving cell associated with a second DRX cycle configuration, and the one or more instructions, that cause the UE to determine the autonomous measurement gap associated with the neighboring cell, cause the UE to determine, based at least in part on the first on duration of the first DRX cycle indicated by the first DRX cycle configuration and a second on duration of a second DRX cycle indicated by the second DRX cycle configuration, the autonomous measurement gap associated with the neighboring cell.

In some aspects, the first serving cell is associated with a first RAT and the second serving cell is associated with a second RAT.

In some aspects, the serving cell is associated with a first RAT and the neighboring cell is associated with a second RAT.

In some aspects, the one or more instructions, that cause the UE to determine the autonomous measurement gap associated with the neighboring cell, cause the UE to: initiate a timer at an end of the first on duration of the first DRX cycle; and determine the autonomous measurement gap based at least in part on determining that: the timer has expired, or the UE has transitioned from an active state of the first DRX cycle to an inactive state of the first DRX cycle.

In some aspects, the one or more instructions further cause the UE to determine an amount of time associated with the timer based at least in part on the first DRX cycle configuration.

In some aspects, the one or more instructions further cause the UE to determine an amount of time associated with the timer based at least in part on at least one of: a DRX cycle length indicated by the first DRX cycle configuration, or an inactivity timer indicated by the first DRX cycle configuration.

In some aspects, the one or more instructions further cause the UE to determine an amount of time associated with the timer based at least in part on the type of traffic of one or more communications received during the first DRX cycle.

In some aspects, the one or more instructions further cause the UE to: identify historical data associated with an amount of time between a start of the on duration of the first DRX cycle and the UE transitioning from the active state of the first DRX cycle to the inactive state of the first DRX cycle; and determine an amount of time associated with the timer based at least in part on the historical data associated with the amount of time between the start of the on duration of the first DRX cycle and the UE transitioning from active state of the first DRX cycle to the inactive state of the first DRX cycle.

In some aspects, the one or more instructions further cause the UE to: determine an amount of time associated with the timer; and reduce the amount of time associated with the timer based at least in part on at least one of: determining that a length of the autonomous measurement gap is less than a threshold, determining that a display of the UE is off and one or more communications received during the first DRX cycle are associated with traffic that is delay tolerant, or determining that one or more previous measurements of the neighboring cell satisfy a measurement threshold.

In some aspects, the one or more instructions further cause the UE to: determine an amount of time associated with the timer; and increase the amount of time associated with the timer based at least in part on at least one of: determining that one or more communications received during the first DRX cycle are associated with traffic that is not delay tolerant, determining that the UE is not located within a coverage area associated with the neighboring cell, or determining that previous measurements of the neighboring cell do not satisfy a measurement threshold.

In some aspects, the one or more instructions, that cause the UE to determine the autonomous measurement gap associated with the neighboring cell, cause the UE to: determine that a plurality of autonomous measurement gaps are to occur during the first DRX cycle; and determine an amount of time associated with the timer based at least in part on the determination that a plurality of autonomous measurement gaps are to occur during the first DRX cycle.

In some aspects, the one or more instructions further cause the UE to receive, from the serving cell, a second DRX cycle configuration, wherein the one or more instructions, that cause the UE to determine the autonomous measurement gap associated with the neighboring cell, cause the UE to determine an amount of time associated with the timer based at least in part on at least one of: the first DRX cycle configuration, the second DRX cycle configuration, or a combination thereof.

In some aspects, the first DRX cycle configuration is associated with a first RAT and the second DRX cycle configuration is associated with a second RAT.

In some aspects, the one or more instructions further cause the UE to determine that a communication received during the first DRX cycle is associated with traffic that is not delay tolerant, wherein the one or more instructions, that cause the UE to determine the autonomous measurement gap associated with the neighboring cell, cause the UE to determine that the autonomous measurement gap associated with the neighboring cell is to occur during an inactive state of the first DRX cycle.

In some aspects, the one or more instructions further cause the UE to: determine that a communication received during the first DRX cycle is associated with traffic that is not delay tolerant; and determine that a communication associated with traffic that is not delay tolerant is not to be received until a next DRX cycle, wherein the one or more instructions, that cause the UE to determine the autonomous measurement gap associated with the neighboring cell, cause the UE to determine that the autonomous measurement gap associated with the neighboring cell is to occur after the communication received during the first DRX cycle that is associated with traffic that is not delay tolerant.

In some aspects, the one or more instructions, that cause the UE to determine that a communication associated with traffic that is not delay tolerant is not to be received until a next DRX cycle, cause the UE to: identify historical data associated with receiving communications associated with traffic that is not delay tolerant; and determine an average amount of time between receiving communications associated with traffic that is not delay tolerant.

In some aspects, the traffic that is not delay tolerant is at least one of: voice traffic, streaming traffic, gaming traffic, extended reality traffic, or virtual reality traffic.

In some aspects, the UE is operating in at least one of: an LTE mode, an Evolved Universal Mobile Telecommunications System Terrestrial Radio Access-NR dual connectivity mode, an NR standalone mode, or an NR dual connectivity mode.

In some aspects, the one or more instructions further cause the UE to: receive, from the serving cell, a measurement configuration indicating a measurement frequency; and determine that the neighboring cell is operating using the measurement frequency.

In some aspects, an apparatus for wireless communication includes: means for establishing a communication connection with a serving cell associated with a first DRX cycle configuration; means for determining, based at least in part on at least one of a first on duration of a first DRX cycle indicated by the first DRX cycle configuration or a type of traffic of one or more communications received during the first DRX cycle, an autonomous measurement gap associated with a neighboring cell; and means for performing a measurement of the neighboring cell during the autonomous measurement gap.

In some aspects, the serving cell includes a first serving cell associated with the first DRX cycle configuration and a second serving cell associated with a second DRX cycle configuration, and the means for determining the autonomous measurement gap associated with the neighboring cell, comprises: means for determining, based at least in part on the first on duration of the first DRX cycle indicated by the first DRX cycle configuration and a second on duration of a second DRX cycle indicated by the second DRX cycle configuration, the autonomous measurement gap associated with the neighboring cell.

In some aspects, the first serving cell is associated with a first RAT and the second serving cell is associated with a second RAT.

In some aspects, the serving cell is associated with a first RAT and the neighboring cell is associated with a second RAT.

In some aspects, the means for determining the autonomous measurement gap associated with the neighboring cell, comprises: means for initiating a timer at an end of the first on duration of the first DRX cycle; and means for determining the autonomous measurement gap based at least in part on determining that: the timer has expired, or the apparatus has transitioned from an active state of the first DRX cycle to an inactive state of the first DRX cycle.

In some aspects, the apparatus includes means for determining an amount of time associated with the timer based at least in part on the first DRX cycle configuration.

In some aspects, the apparatus includes means for determining an amount of time associated with the timer based at least in part on at least one of: a DRX cycle length indicated by the first DRX cycle configuration, or an inactivity timer indicated by the first DRX cycle configuration.

In some aspects, the apparatus includes means for determining an amount of time associated with the timer based at least in part on the type of traffic of one or more communications received during the first DRX cycle.

In some aspects, the apparatus includes means for identifying historical data associated with an amount of time between a start of the on duration of the first DRX cycle and the apparatus transitioning from the active state of the first DRX cycle to the inactive state of the first DRX cycle; and means for determining an amount of time associated with the timer based at least in part on the historical data associated with the amount of time between the start of the on duration of the first DRX cycle and the apparatus transitioning from the active state of the first DRX cycle to the inactive state of the first DRX cycle.

In some aspects, the apparatus includes means for determining an amount of time associated with the timer; and means for reducing the amount of time associated with the timer based at least in part on at least one of: determining that a length of the autonomous measurement gap is less than a threshold, determining that a display of the UE is off and one or more communications received during the first DRX cycle are associated with traffic that is delay tolerant, or determining that one or more previous measurements of the neighboring cell satisfy a measurement threshold.

In some aspects, the apparatus includes means for determining an amount of time associated with the timer; and means for increasing the amount of time associated with the timer based at least in part on at least one of: determining that one or more communications received during the first DRX cycle are associated with traffic that is not delay tolerant, determining that the UE is not located within a coverage area associated with the neighboring cell, or determining that previous measurements of the neighboring cell do not satisfy a measurement threshold.

In some aspects, the means for determining the autonomous measurement gap associated with the neighboring cell comprises: means for determining that a plurality of autonomous measurement gaps are to occur during the first DRX cycle; and means for determining an amount of time associated with the timer based at least in part on the determination that a plurality of autonomous measurement gaps are to occur during the first DRX cycle.

In some aspects, the apparatus includes means for receiving, from the serving cell, a second DRX cycle configuration, wherein the means for determining the autonomous measurement gap associated with the neighboring cell comprises means for determining an amount of time associated with the timer based at least in part on at least one of: the first DRX cycle configuration, the second DRX cycle configuration, or a combination thereof.

In some aspects, the first DRX cycle configuration is associated with a first RAT and the second DRX cycle configuration is associated with a second RAT.

In some aspects, the apparatus includes means for determining that a communication received during the first DRX cycle is associated with traffic that is not delay tolerant, wherein the means for determining the autonomous measurement gap associated with the neighboring cell comprises means for determining that the autonomous measurement gap associated with the neighboring cell is to occur during an inactive state of the first DRX cycle.

In some aspects, the apparatus includes means for determining that a communication received during the first DRX cycle is associated with traffic that is not delay tolerant; and means for determining that a communication associated with traffic that is not delay tolerant is not to be received until a next DRX cycle, wherein the means for determining the autonomous measurement gap associated with the neighboring cell comprises means for determining that the autonomous measurement gap associated with the neighboring cell is to occur after the communication received during the first DRX cycle that is associated with traffic that is not delay tolerant.

In some aspects, the means for determining that a communication associated with traffic that is not delay tolerant is not to be received until a next DRX cycle comprises: means for identifying historical data associated with receiving communications associated with traffic that is not delay tolerant; and means for determining an average amount of time between receiving communications associated with traffic that is not delay tolerant.

In some aspects, the traffic that is not delay tolerant is at least one of: voice traffic, streaming traffic, gaming traffic, extended reality traffic, or virtual reality traffic.

In some aspects, the apparatus is operating in at least one of: an LTE mode, an Evolved Universal Mobile Telecommunications System Terrestrial Radio Access-NR dual connectivity mode, an NR standalone mode, or an NR dual connectivity mode.

In some aspects, the apparatus includes means for receiving, from the serving cell, a measurement configuration indicating a measurement frequency; and means for determining that the neighboring cell is operating using the measurement frequency.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
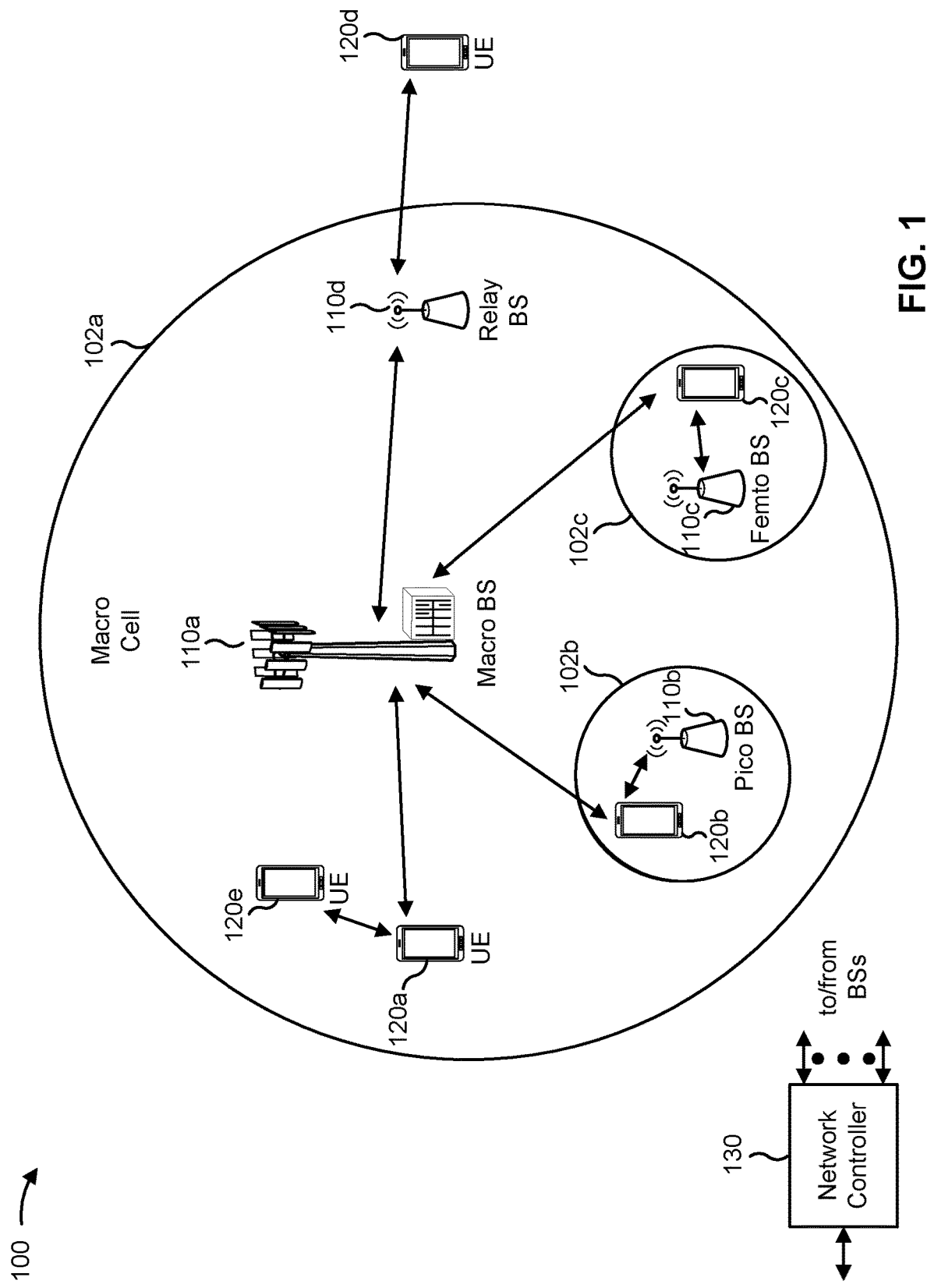
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
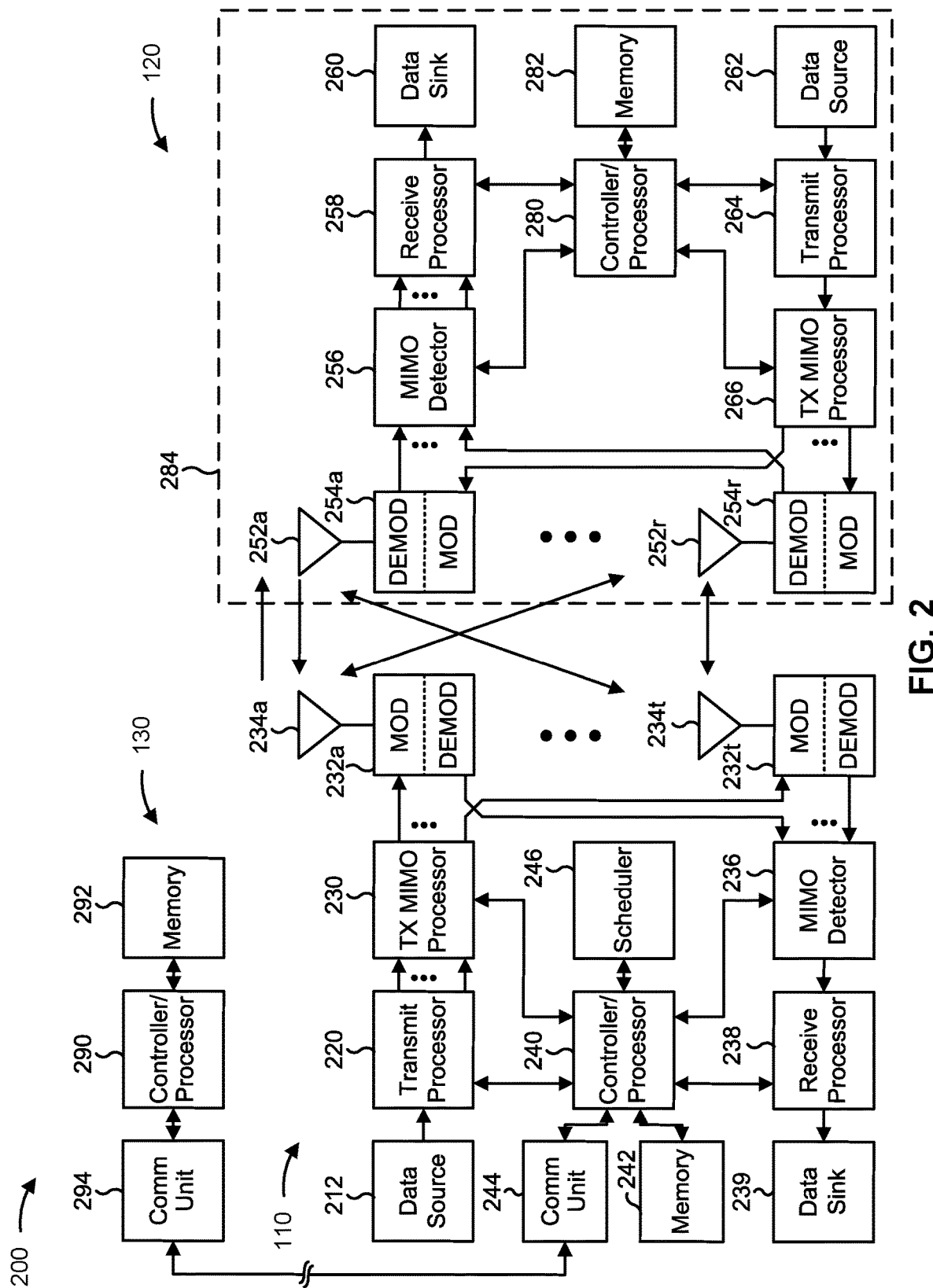
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be preceded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with discontinuous reception (DRX) cycle based measurement gaps, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, interpreting the instructions, and/or the like.

In some aspects, UE 120 may include means for establishing a communication connection with a serving cell associated with a first DRX cycle configuration, means for determining, based at least in part on at least one of a first on duration of a first DRX cycle indicated by the first DRX cycle configuration or a type of traffic of one or more communications received during the first DRX cycle, an autonomous measurement gap associated with a neighboring cell, means for performing a measurement of the neighboring cell during the autonomous measurement gap, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
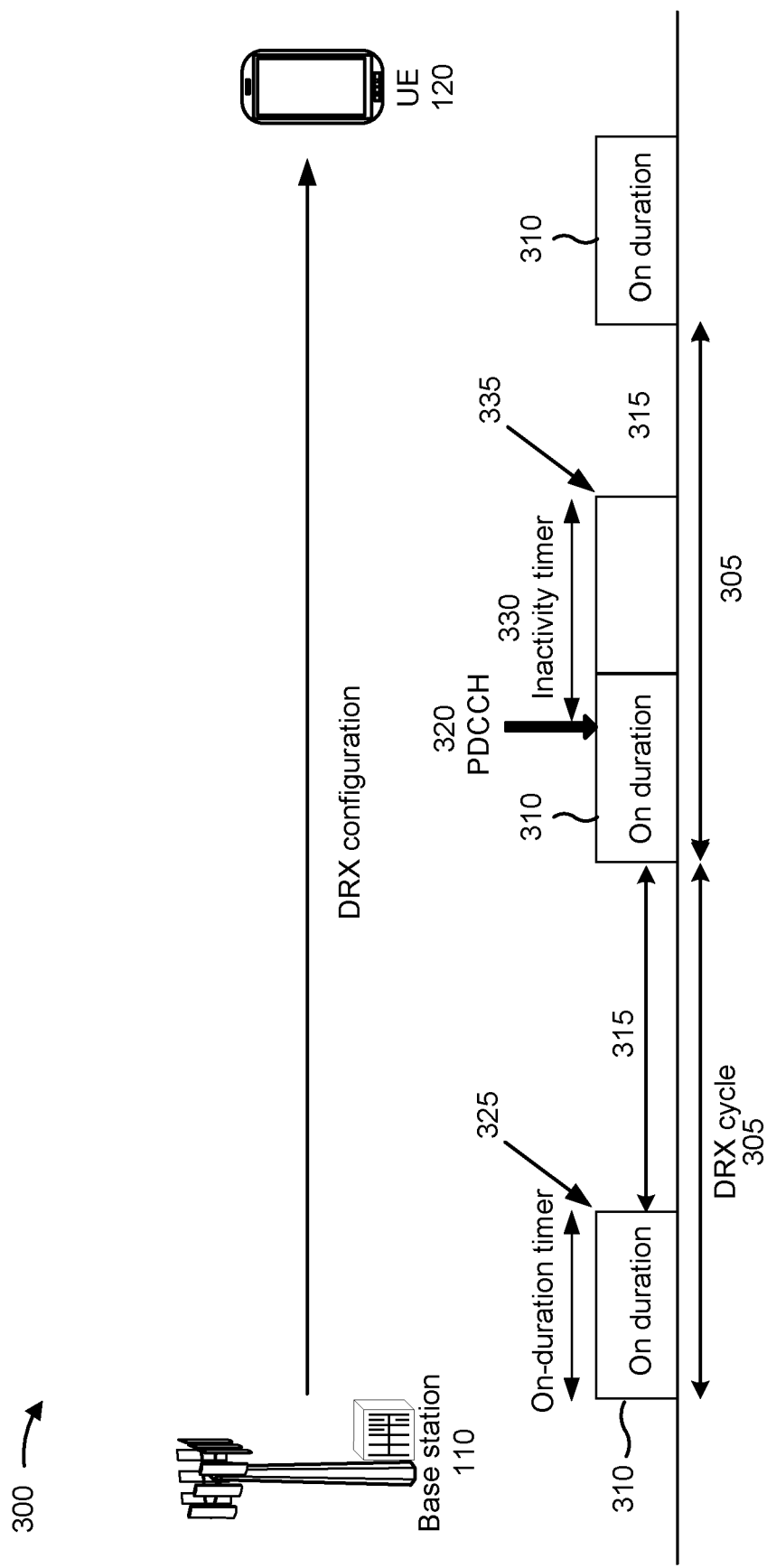
FIG. 3 is a diagram illustrating an example of a discontinuous reception (DRX) configuration, in accordance with various aspects of the present disclosure.

FIG. 3 is a diagram illustrating an example 300 of a DRX configuration, in accordance with various aspects of the present disclosure.

As shown in FIG. 3, a base station 110 may transmit a DRX configuration to a UE 120 to configure a DRX cycle 305 for the UE 120. A DRX cycle 305 may include a DRX on duration 310 (e.g., during which a UE 120 is awake or in an active state) and an opportunity to enter a DRX sleep state 315. As used herein, the time during which the UE 120 is configured to be in an active state during the DRX on duration 310 may be referred to as an active time, and the time during which the UE 120 is configured to be in the DRX sleep state 315 may be referred to as an inactive time. As described below, the UE 120 may monitor a physical downlink control channel (PDCCH) during the active time and may refrain from monitoring the PDCCH during the inactive time.

During the DRX on duration 310 (e.g., the active time), the UE 120 may monitor a downlink control channel (e.g., a PDCCH), as shown by reference number 320. For example, the UE 120 may monitor the PDCCH for downlink control information (DCI) pertaining to the UE 120. If the UE 120 does not detect and/or does not successfully decode any PDCCH communications intended for the UE 120 during the DRX on duration 310, then the UE 120 may enter the sleep state 315 (e.g., for the inactive time) at the end of the DRX on duration 310, as shown by reference number 325. In this way, the UE 120 may conserve battery power and reduce power consumption. As shown, the DRX cycle 305 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 330 (e.g., which may extend the active time). The UE 120 may start the DRX inactivity timer 330 at a time at which the PDCCH communication is received (e.g., in a transmission time interval (TTI) in which the PDCCH communication is received, such as a slot, a subframe, and/or the like). The UE 120 may remain in the active state until the DRX inactivity timer 330 expires, at which time the UE 120 may enter the sleep state 315 (e.g., for the inactive time), as shown by reference number 335. During the duration of the DRX inactivity timer 330, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication, and/or the like. The UE 120 may restart the DRX inactivity timer 330 after each detection of a PDCCH communication for the UE 120 for an initial transmission (e.g., but not for a retransmission). By operating in this manner, the UE 120 may conserve battery power and reduce power consumption by entering the sleep state 315.

As indicated above, FIG. 3 is provided as an example. Other examples may differ from what is described with respect to FIG. 3.

In some wireless networks, a UE may be configured, by a base station of a serving cell, to perform measurements of one or more neighboring cells. For example, the UE may be configured to perform inter-radio access technology (inter-RAT) measurements (e.g., the serving cell may be associated with a first RAT and the one or more neighboring cells may be associated with a second, different RAT). In some cases, the serving cell may include a plurality of cells associated with a plurality of RATs, respectively (e.g., the serving cell may include a first serving cell associated with a first RAT and a second serving cell associated with a second RAT). In some cases, the UE may be configured to perform measurements of target cells to be added as secondary cells in a dual connectivity mode (e.g., an Evolved Universal Mobile Telecommunications System Terrestrial Radio Access (E-UTRA)-New Radio (NR) dual connectivity (ENDC) mode, an NR dual connectivity (NRDC) mode, and/or the like). For example, target cells to be added as secondary cells in a dual connectivity mode may be neighboring cells.

The base station of the serving cell may configure measurement gaps (e.g., in which the UE does not transmit and/or receive communications associated with the serving cell) to perform the measurements of the one or more neighboring cells. However, the measurement gaps configured by the serving cell may be offset in the time domain from signals (e.g., synchronization signal blocks (SSBs)) from a neighboring cell to be measured by the UE. For example, the measurement gaps configured by the serving cell may be offset in the time domain from SSBs transmitted by a neighboring cell due to a time difference in the frame structure of the serving cell and the frame structure of the neighboring cell. As a result, the UE may be unable to measure an SSB from the neighboring cell during the measurement gaps configured by the serving cell. Therefore, the UE may autonomously determine measurement gaps for measuring SSBs transmitted by the neighboring cell. For example, the UE may extend a measurement gap configured by the serving cell to determine when, in the time domain, an SSB is transmitted by the neighboring cell. The UE may autonomously determine a measurement gap to align, in the time domain, with the SSBs transmitted by the neighboring cell. In some aspects, the SSBs transmitted by the neighboring cell may have a periodicity between 5 ms and 160 ms. The measurement gaps determined by the UE, as described above, may be referred to herein as autonomous measurement gaps (e.g., an autonomous measurement gap may be a measurement gap that is determined by the UE without a measurement gap configuration from a base station, may be a measurement gap that is determined by the UE by modifying a measurement gap configured by a base station, and/or the like). As the autonomous measurement gaps are determined by the UE, the base station of the serving cell may continue to schedule and/or transmit communications during the autonomous measurement gaps. However, in some cases, the UE may be unable to receive and/or decode communications from the base station of the serving cell during the autonomous measurement gaps (e.g., due to baseband conflicts, radio frequency (RF) component conflicts, and/or the like).

In some cases, the UE may determine that a measurement of a neighboring cell is to occur during a DRX cycle of the serving cell. For example, the UE may be configured to perform measurements of the neighboring cell according to a search periodicity and/or a measurement periodicity. The UE may determine, according to the search periodicity and/or the measurement periodicity, that a measurement of the neighboring cell is to occur during the DRX cycle of the serving cell. In some cases, the UE may use a measurement gap configured by the serving cell to perform the measurement of the neighboring cell during the DRX cycle (e.g., where the measurement gaps are configured correctly by the serving cell). In some cases, where the UE is capable of performing gapless measurements (e.g., where the UE is capable of performing measurements without a measurement gap) the UE may perform the measurement of the neighboring cell during the DRX cycle without a measurement gap. However, in some cases, the UE may determine an autonomous measurement gap is required for performing the measurement of the neighboring cell during the DRX cycle. However, if the autonomous measurement gap occurs during an on duration or an active time associated with the DRX cycle, throughput associated with the serving cell may be degraded (e.g., as the UE may be unable to receive and/or decode communications from the serving cell during the autonomous measurement gap). As a result, packet loss or delay may occur with communications transmitted by the serving cell to the UE during the autonomous measurement gap.

Some techniques and apparatuses described herein enable DRX cycle based measurement gaps. For example, the UE may determine that a measurement of a neighboring cell is to occur during a DRX cycle of the serving cell. The UE may autonomously (e.g., without configuration by the base station or independently of a configuration by the base station) determine that an autonomous measurement gap is needed to perform the measurement of the neighboring cell. The UE may determine (or autonomously schedule) an autonomous measurement gap to perform the measurement of the neighboring cell based at least in part on a DRX configuration associated with the DRX cycle. For example, the UE may determine an amount of time after an on duration (e.g., such as the DRX on duration 310 described above with respect to FIG. 3) of the DRX cycle to wait before determining that an autonomous measurement gap for the measurement of the neighboring cell is to occur. The UE may determine that the autonomous measurement gap is to occur after the amount of time or after the UE transitions from an active state to an inactive state associated with the DRX cycle. Therefore, the UE may determine that the autonomous measurement gap is to occur as close to an off duration (or an inactive period) (e.g., such as the DRX sleep state 315 described above with respect to FIG. 3) of the DRX cycle as possible. As a result, the UE improves throughput associated with the serving cell as delay and/or packet loss caused by autonomous measurement gaps may be minimized (e.g., as the autonomous measurement gaps will not occur during an on duration or an active time associated with the DRX cycle).

Figure 4:
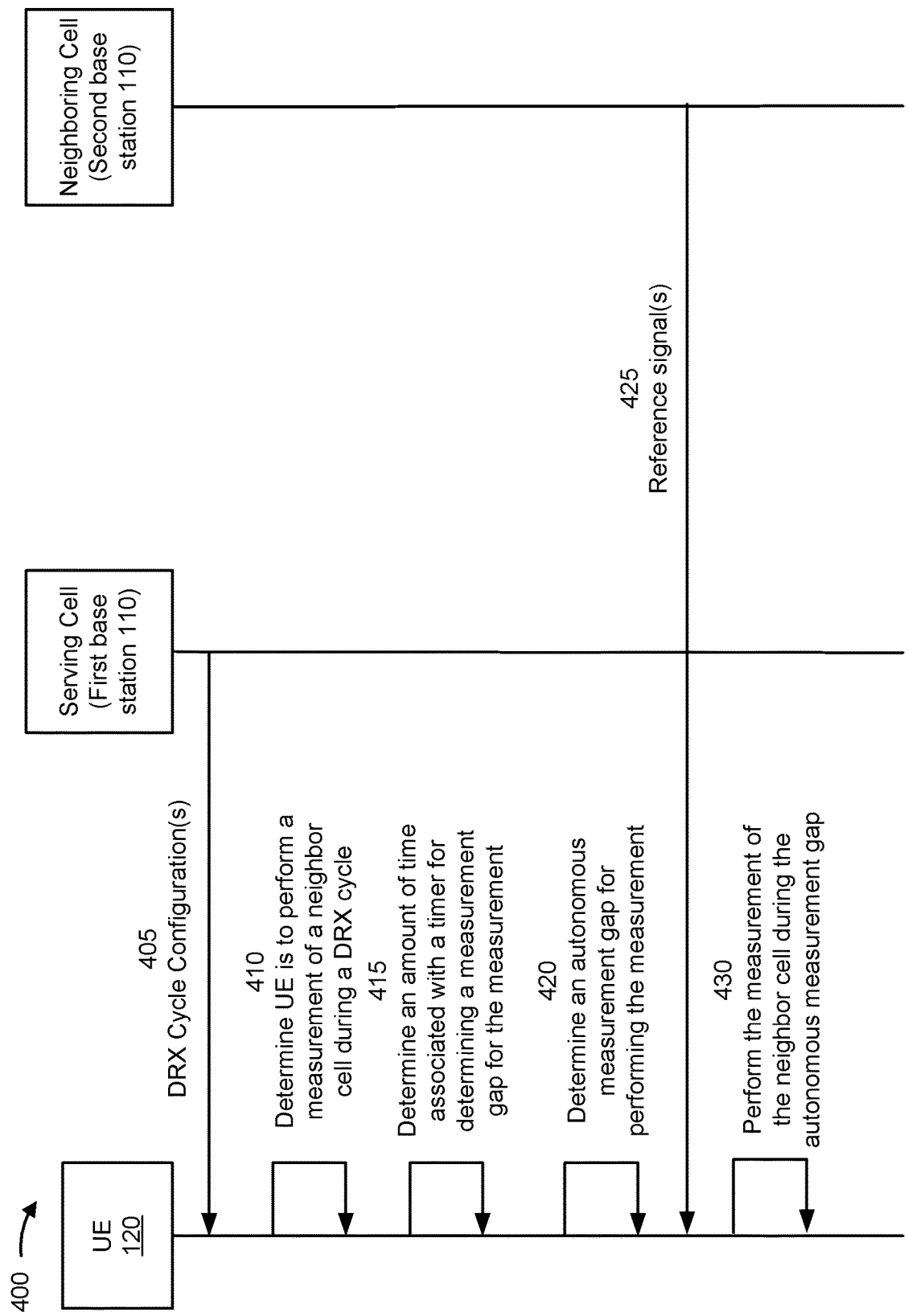
FIGS. 4 and 5 are diagrams illustrating examples associated with techniques for DRX cycle based measurement gaps, in accordance with various aspects of the present disclosure.

FIG. 4 is a diagram illustrating an example 400 associated with techniques for DRX cycle based measurement gaps, in accordance with various aspects of the present disclosure. As shown in FIG. 4, a first base station 110 of a serving cell and a UE 120 may communicate with one another in a wireless network (e.g., wireless network 100). Similarly, the UE 120 may communicate with a second base station 110 of a neighboring cell. In some aspects, the UE 120 may communicate with a plurality of neighboring cells, or the neighboring cell may include a plurality of cells.

In some aspects, the serving cell may be associated with a first RAT (e.g., a 4G RAT, an LTE RAT, and/or the like) and the neighboring cell may be associated with a second RAT (e.g., a 5G RAT, an NR RAT, and/or the like). In some aspects, the serving cell may include a plurality of serving cells and each of the plurality of serving cells may be associated with a different RAT. That is, the serving cell may include a plurality of cells and the UE 120 may communicate with the serving cell in a dual connectivity mode (e.g., the UE 120 may establish a plurality of communication connections with the serving cell). In some aspects, the serving cell may include a first serving cell associated with a first RAT and a second serving cell associated with a second RAT. In some aspects, the first RAT and the second RAT may be different. In other aspects, the first RAT and the second RAT may be the same. In some aspects, the neighboring cell may include a plurality of neighboring cells and each of the plurality of neighboring cells may be associated with a different RAT. In some aspects, the neighboring cell may include a plurality of neighboring cells. In some aspects, the neighboring cell may include a first neighboring cell associated with a first RAT and a second neighboring cell associated with a second RAT. In some aspects, the first RAT and the second RAT may be different. In other aspects, the first RAT and the second RAT may be the same.

In some aspects, the UE 120 may establish a communication connection with the serving cell (e.g., with the first base station 110). The communication connection with the serving cell may use an LTE RAT, an NR RAT, and/or the like. In some aspects, the UE 120 may establish a plurality of communication connections with the serving cell in a dual connectivity mode (e.g., an ENDC mode, an NRDC mode, and/or the like). For example, the serving cell may be a master cell group. The neighboring cell may be a candidate cell to add as a secondary cell (e.g., a primary secondary cell) of a secondary cell group. In some aspects, the neighboring cell may be a candidate cell for a handover procedure (e.g., from the serving cell to the neighboring cell). For example, a candidate cell for a handover procedure may be a neighboring cell, as shown in FIG. 4.

As shown by reference number 405, the UE 120 may receive a DRX cycle configuration from the serving cell. The DRX cycle configuration may configure a DRX cycle for the UE 120 associated with the serving cell. A DRX cycle may include a DRX on duration (e.g., during which a UE 120 is awake or in an active state) and an opportunity to enter a DRX sleep state (e.g., to enter an inactive state). The DRX cycle configuration may configure a length or amount of time associated with a DRX cycle (e.g., an amount of time between on durations of consecutive DRX cycles). For example, a DRX cycle may be a short DRX cycle (e.g., less than 160 ms) or a long DRX cycle (e.g., more than or equal to 160 ms). In some aspects, the DRX cycle configuration may be a connected mode DRX (CDRX) cycle configuration. In some aspects, a CDRX cycle configuration may be associated with a long DRX cycle (e.g. approximately 160 ms, 320 ms, 640 ms, and/or the like). Therefore, as described herein, "DRX cycle" may refer to a CDRX cycle.

In some aspects, if the UE 120 detects and/or successfully decodes a PDCCH communication intended for the UE 120 during an on duration of a DRX cycle, then the UE 120 may remain in an active state (e.g., awake) for the duration of a DRX inactivity timer. The DRX cycle configuration may configure an amount of time associated with the DRX inactivity timer.

In some aspects, the UE 120 may receive a plurality of DRX cycle configurations from the serving cell, such as when the serving cell includes multiple cells. For example, the UE 120 may receive a DRX cycle configuration from each cell included in the serving cell. The UE 120 may receive a first DRX cycle configuration from a first serving cell (e.g., for communicating with the first serving cell) and a second DRX cycle configuration from a second serving cell (e.g., for communicating with the second serving cell). In some aspects, the first DRX cycle configuration and the second DRX cycle configuration may configure a different length or amount of time associated with a DRX cycle, a different amount of time associated with a DRX inactivity timer, and/or the like. As a result, as described herein, "DRX cycle" or "DRX cycle configuration" may refer to one or more DRX cycles or one or more DRX cycle configurations received from the serving cell. For example, as described herein, a determination or an action that is based at least in part on a DRX cycle or based at least in part on a DRX cycle configuration may be based at least in part on a plurality of DRX cycles or a plurality of DRX cycle configurations.

As shown by reference number 410, the UE 120 may determine that the UE 120 is to perform a measurement of the neighboring cell during a DRX cycle. For example, the UE 120 may receive a measurement configuration for performing measurements of the neighboring cell. In some aspects, the measurement configuration may indicate a measurement periodicity and/or a search periodicity associated with performing measurements of one or more neighboring cells. In some aspects, the measurement configuration may be an inter-RAT measurement configuration. In some aspects, the measurement configuration may be transmitted by the serving cell to the UE 120. In some aspects, the measurement configuration may be transmitted by the neighboring cell to the UE 120. In some aspects, the measurement configuration may include a configuration for a measurement object for which the UE 120 is to perform a measurement (e.g., information that identifies a carrier frequency, a white list of cells to be considered, a black list of cells to be considered, a parameter associated with a frequency-specific offset, a parameter associated with a cell-specific offset, and/or the like). In some aspects, the measurement configuration may include configurations for multiple measurement objects.

Upon entering an on duration of a DRX cycle, the UE 120 may determine that a measurement of at least one neighboring cell has been triggered during the DRX cycle. In some aspects, the measurement configuration may indicate a measurement frequency. The UE 120 may determine that the neighboring cell is operating using the measurement frequency indicated by the measurement configuration. In some aspects, the UE 120 may determine that a search periodicity or a measurement periodicity indicated in a measurement configuration will expire during the DRX cycle. As a result, the UE 120 may determine that a measurement of one or more neighboring cells associated with the measurement object is to be performed during the DRX cycle.

The UE 120 may determine a measurement gap (e.g., an autonomous measurement gap) during which the UE 120 is to perform the measurement of a neighboring cell based at least in part on determining that a measurement of one or more neighboring cells associated with the measurement object is to be performed during the DRX cycle. In some aspects, the UE 120 may determine that a measurement gap configured by the serving cell may be used to perform the measurement (e.g., such that an autonomous measurement gap may not be necessary). In some aspects, the UE 120 may be capable of performing a measurement without a measurement gap (e.g., such that an autonomous measurement gap may not be necessary). However, in some aspects, the UE 120 may determine that one or more measurement gaps configured by the serving cell during the DRX cycle are not sufficient for performing the measurement of the neighboring cell (e.g., due to an offset in the time domain with a signal from the serving cell, as described above) or that no measurement gap is configured by the serving cell during the DRX cycle that includes a time when the measurement of at least one neighboring cell is triggered, as described above. As a result, the UE 120 may determine that an autonomous measurement gap is needed to perform the measurement of the neighboring cell during the DRX cycle.

As shown by reference number 415, the UE 120 may determine an amount of time associated with a timer for determining the autonomous measurement gap during which the UE 120 is to perform the measurement of the neighboring cell. The timer may be configured with an amount of time after the on duration of the DRX cycle before the autonomous measurement gap may occur. In some aspects, the timer may be associated with an amount of time after the on duration of the DRX cycle that the UE 120 is expected to transition to an inactive state (e.g., based at least in part on an expiration of the DRX inactivity timer associated with the DRX cycle). The timer for determining the autonomous measurement gap may be determined by the UE 120 such that the autonomous measurement gap occurs as close as possible to an inactive state or an off duration of the DRX cycle.

The UE 120 may determine the amount of time associated with the timer for determining the autonomous measurement gap based at least in part on the DRX cycle configuration received from the serving cell. As described above, the UE 120 may determine the amount of time associated with the timer for determining the autonomous measurement gap based at least in part on a plurality of DRX cycle configurations received from the serving cell. In some aspects, the UE 120 may determine the amount of time associated with the timer for determining the autonomous measurement gap based at least in part on the length or the amount of time associated with a DRX cycle (e.g., indicated in the DRX cycle configuration), the amount of time associated with the DRX inactivity timer (e.g., indicated in the DRX cycle configuration), and/or the like. For example, if the DRX cycle has a length of 40 ms, then the amount of time associated with the timer may be 25 ms. If the DRX cycle has a length between 40 ms and 160 ms, then the amount of time associated with the timer may be 40 ms. If the DRX cycle has a length of 160 ms, then the amount of time associated with the timer may be 100 ms. If the DRX cycle has a length of 320 ms, then the amount of time associated with the timer may be 150 ms. If the DRX cycle has a length of 640 ms or more, then the amount of time associated with the timer may be 250 ms. The foregoing amounts of time associated with the timer are provided as examples. Other examples of amounts of time associated with the timer may differ from what is described above.

In some aspects, the UE 120 may determine the amount of time associated with the timer for determining the autonomous measurement gap based at least in part on a point in time in which the UE 120 (or a plurality of UEs 120 configured with the DRX cycle configuration) typically enters an inactive state associated with the DRX cycle. For example, the UE 120 may identify historical data associated with previous DRX cycles to determine a point in time during the DRX cycle in which the UE 120 typically enters an inactive state. In some aspects, the UE 120 may utilize a machine learning model to analyze the historical data associated with previous DRX cycles to determine the point in time during the DRX cycle in which the UE 120 typically enters an inactive state. In some aspects, the historical data may include hundreds, thousands, or millions of data points (e.g., associated with previous DRX cycles). In some aspects, another device (e.g., a base station 110, the first base station 110, a network device, and/or the like) may determine the point in time during the DRX cycle in which the UE 120 (or a plurality of UEs configured with the DRX cycle configuration) typically enters an inactive state, as described above.

In some aspects, as described above, the UE 120 may be configured with a plurality of DRX configurations by the serving cell. For example, the serving cell may be a dual connectivity serving cell that includes a first serving cell (e.g., a master cell group) and a second serving cell (e.g., a secondary cell group). The first serving cell and the second serving cell may be associated with different RATs or the same RAT. For example, the first serving cell may be an LTE cell and the second serving cell may be an NR cell. The first serving cell may configure a first DRX cycle configuration for the UE 120, and the second serving cell may configure a second DRX cycle configuration for the UE 120. The UE 120 may determine the amount of time associated with the timer for determining the autonomous measurement gap based at least in part on the first DRX cycle configuration, the second DRX cycle configuration, or both. For example, if the first DRX cycle configuration is associated with a first RAT and the second DRX cycle configuration is associated with a second RAT, then the UE 120 may determine the autonomous measurement gap such that the autonomous measurement gap occurs as close as possible to an inactive time or an off duration of the first DRX cycle configuration of the first RAT.

Similarly, the UE 120 may determine the autonomous measurement gap such that the autonomous measurement gap occurs as close as possible to an inactive time or an off duration of the second DRX cycle configuration of the second RAT. In some aspects, the UE 120 may determine an off duration overlap between the first DRX cycle configuration and the second DRX cycle configuration (e.g., a time during which both DRX cycle configurations are typically in an inactive state or an off duration). The UE 120 may determine the autonomous measurement gap such that the autonomous measurement gap occurs as close as possible to the time during which both DRX cycle configurations are typically in an inactive state or an off duration.

In some aspects, the UE 120 may determine the amount of time associated with the timer for determining the autonomous measurement gap based at least in part on a length or an amount of time associated with the autonomous measurement gap (e.g., a duration of the autonomous measurement gap). For example, if the amount of time associated with the autonomous measurement gap satisfies (e.g., is smaller than) a threshold, then the amount of time associated with the timer may be reduced. In some aspects, the threshold may be 2 ms, 3 ms, 5 ms, 8 ms, and/or the like. A shorter autonomous measurement gap may have less impact on throughput of the serving cell. As a result, the amount of time associated with the timer for determining the autonomous measurement gap may be reduced such that the autonomous measurement gap (e.g., the measurement of the neighboring cell) may occur closer to the on duration of the DRX cycle. Therefore, the autonomous measurement gap (e.g., and the measurement of the neighboring cell) may occur earlier in the time domain.

In some aspects, the UE 120 may determine the amount of time associated with the timer for determining the autonomous measurement gap based at least in part on one or more communications received by the UE 120 during the on duration or active time associated with the DRX cycle. For example, a communication received by the UE 120 may be associated with traffic that is delay tolerant or not delay tolerant. Traffic that is delay tolerant may include traffic associated with background applications (e.g., application refreshes, email downloads, data backups, and/or the like). Traffic that is delay tolerant may be tolerant of some packet loss. Traffic that is not delay tolerant may be traffic that is susceptible to packet loss or delays (e.g., associated with a longer hybrid automatic repeat request (HARD) process, a longer radio link control (RLC) recovery process, and/or the like).

For example, traffic that is not delay tolerant may be traffic associated with a foreground application (e.g., an application that a user of the UE 120 is actively using or otherwise engaging in an active manner). In some aspects, traffic that is not delay tolerant may be traffic associated with applications that are latency-sensitive, delay-sensitive, packet loss-sensitive, and/or the like. For example, traffic that is not delay tolerant may be traffic associated with a voice application (e.g., a voice over LTE (VoLTE) application and/or the like), a video call application, a video streaming application, a music streaming application, a gaming application, a navigation application, an extended reality application, a virtual reality application, an augmented reality application, and/or the like.

For example, a communication received by the UE 120 during the on duration or active time associated with the DRX cycle may be associated with traffic that is not delay tolerant, such as VoLTE traffic. The UE 120 may determine that the autonomous measurement gap is to occur during an inactive state of the DRX cycle in which the traffic that is not delay tolerant is received. For example, VoLTE traffic may be typically associated with an active time of 12 ms (e.g., in a 40 ms DRX cycle). The UE 120 may determine that the autonomous measurement gap is to occur during the remaining 28 ms (e.g., in the 40 ms DRX cycle) that is typically associated with the inactive state of the DRX cycle (e.g., for VoLTE traffic or other traffic that is not delay tolerant). In some aspects, the UE 120 may determine the amount of time associated with the timer for determining the autonomous measurement gap based at least in part on the typical active time associated with the traffic that is not delay tolerant. If the UE 120 determines that an autonomous measurement gap is unable to occur during the inactive state of the DRX cycle in which the traffic that is not delay tolerant is received in one or more prior occasions (e.g., due to the active time of the DRX cycle being longer than expected), then the UE 120 may modify a search or measurement periodicity of the autonomous measurement gaps. For example, the UE 120 may reduce a search period and/or a measurement period associated with the autonomous measurement gap.

In some aspects, the UE 120 may determine the amount of time associated with the timer for determining the autonomous measurement gap based at least in part on determining that a display of the UE 120 is off (e.g., is asleep, is in a power save mode, is not displaying, and/or the like) and that one or more communications received during the DRX cycle are associated with traffic that is delay tolerant. If the UE 120 determines that the display of the UE 120 is off and that one or more communications received during the DRX cycle are associated with traffic that is delay tolerant, the UE 120 may determine that the amount of time associated with the timer may be reduced (e.g., may be a lower amount of time than a baseline amount of time associated with the timer). For example, if the UE 120 determines that the display of the UE 120 is off and one or more communications received during the DRX cycle are associated with background applications, then the UE 120 may reduce the amount of time associated with the timer, thereby enabling the UE 120 to perform measurements of the neighboring cell earlier in the time domain.

In some aspects, the UE 120 may determine the amount of time associated with the timer for determining the autonomous measurement gap based at least in part on determining that the UE 120 is located in a coverage area associated with one or more neighboring cells. The UE 120 may determine that one or more previous measurements of the one or more neighboring cells satisfy a first threshold (e.g., are within a range associated with the first threshold). The UE 120 may determine that the amount of time associated with the timer may be reduced based at least in part on determining that one or more previous measurements of the one or more neighboring cells satisfy the first threshold.

For example, the serving cell may be associated with an LTE RAT. The neighboring cell may be associated with an NR RAT. If one or more measurements of the neighboring cell satisfy a measurement threshold for reporting measurements of NR cells (or are within a threshold amount of the measurement threshold for reporting measurements of NR cells), then the UE 120 may reduce the amount of time associated with the timer. As a result, the autonomous measurement gap may occur earlier in the time domain, allowing the UE 120 to perform measurements of the neighboring cell earlier in the time domain. Performing measurements of the neighboring cell earlier in the time domain may improve network performance as the neighboring cell may be added as an ENDC secondary cell or the serving cell may initiate a handover procedure from the serving cell (e.g., the LTE cell) to the neighboring cell (e.g., the NR cell) earlier.

In some aspects, the UE 120 may determine the amount of time associated with the timer for determining the autonomous measurement gap based at least in part on determining that one or more communications received during the DRX cycle are associated with traffic that is not delay tolerant. For example, the UE 120 may determine that a communication received during the DRX cycle is associated with a foreground application. Similarly, the UE 120 may determine that a communication received during the DRX cycle is associated with a longer active time (e.g., of the DRX cycle). If the UE 120 determines that one or more communications received during the DRX cycle are associated with traffic that is not delay tolerant, the UE 120 may determine that the amount of time associated with the timer may be increased (e.g., may be a larger amount of time than a baseline amount of time associated with the timer).

In some aspects, the UE 120 may determine the amount of time associated with the timer for determining the autonomous measurement gap based at least in part on determining that the UE 120 is not located within a coverage area associated with the neighboring cell. For example, the UE 120 may be configured to perform measurements of neighboring cells associated with a RAT (e.g., an NR RAT), but the UE 120 may determine that the UE 120 is not located within a coverage area associated with a neighboring cell of the RAT. The UE 120 may determine that the UE 120 is not located within a coverage area associated with the neighboring cell based at least in part on historical data of the location of the UE 120.

For example, the UE 120 may determine that the UE 120 has frequently been located in an area. The UE 120 may determine, based on the historical data of the area, that there are no neighboring cells associated with the RAT in that area. In some aspects, the UE 120 may determine that the UE 120 is not located within a coverage area associated with the neighboring cell based at least in part on previous measurements or cell searches performed by the UE 120. For example, the UE 120 may search for a neighboring cell associated with the RAT and determine that the UE 120 is not located within a coverage area of a neighboring cell associated with the RAT (e.g., no neighboring cells associated with the RAT are detected by the UE 120). If the UE 120 determines that the UE 120 is not located within a coverage area associated with the neighboring cell, the UE 120 may determine that the amount of time associated with the timer may be increased.

In some aspects, the UE 120 may determine the amount of time associated with the timer for determining the autonomous measurement gap based at least in part on determining that one or more previous measurements of the neighboring cell do not satisfy a second threshold (e.g., determining that one or more previous measurements of the neighboring cell are poor). In some aspects, the second threshold may be the same as the first threshold described above. In some aspects, the second threshold may be different than the first threshold described above. The second threshold may be based at least in part on a measurement timer threshold for reporting neighboring cells to the serving cell. For example, the UE 120 may determine that a difference between one or more previous measurements of the neighboring cell and the measurement threshold for reporting neighboring cells to the serving cell does not satisfy the second threshold. If the UE 120 determines that one or more previous measurements of the neighboring cell do not satisfy the second threshold, then the UE 120 may determine that the amount of time associated with the timer may be increased.

In some aspects, the UE 120 may determine that communications associated with traffic that is not delay tolerant may be received according to a periodic schedule. For example, for certain applications, the UE 120 may determine that communications associated with the application are typically received in a periodic fashion (e.g., based at least in part on a periodic schedule associated with the communications, based at least in part on historical data associated with the communications, and/or the like). The UE 120 may determine the amount of time associated with the timer for determining the autonomous measurement gap based at least in part on the periodic nature of communications associated with the traffic that is not delay tolerant.

For example, the UE 120 may determine that a communication associated with a foreground application is received during the DRX cycle. The UE 120 may determine that a communication associated with the foreground application (or another application associated with traffic that is not delay tolerant, such as VoLTE traffic) is not expected to be received until a next DRX cycle (e.g., based at least in part on a periodic schedule of the communications associated with the foreground application, based at least in part on historical data of communications associated with the foreground application, and/or the like). As a result, the UE 120 may determine the amount of time associated with the timer for determining the autonomous measurement gap is to be reduced such that the autonomous measurement gap may occur directly after (or shortly after, such as 3 ms after, 5 ms after, and/or the like) the communication associated with the traffic that is not delay tolerant.

In some aspects, the UE 120 may determine that a plurality of autonomous measurement gaps are to occur in the DRX cycle. The UE 120 may modify the amount of time associated with the timer for determining the autonomous measurement gap based at least in part on determining that a plurality of autonomous measurement gaps are to occur in the DRX cycle. For example, the UE 120 may reduce the amount of time associated with the timer to enable the plurality of autonomous measurement gaps to be scheduled during the DRX cycle. In some aspects, the UE 120 may determine that one or more of the plurality of autonomous measurement gaps are to be delayed to a subsequent DRX cycle.

In some aspects, the UE 120 may modify the amount of time associated with the timer for determining the autonomous measurement gap based at least in part on an analysis of a throughput degradation caused by previous autonomous measurement gaps determined using the timer. For example, if the UE 120 determines that previous autonomous measurement gaps determined using the timer caused high amounts of throughput degradation (e.g., a high block error rate of communications and/or the like) on the serving cell, then the UE 120 may increase the amount of time associated with the timer. If the UE 120 determines that previous autonomous measurement gaps determined using the timer caused low amounts of throughput degradation on the serving cell, then the UE 120 may reduce the amount of time associated with the timer. In this way, the UE 120 may optimize the amount of time associated with the timer to reduce throughput degradation caused by the autonomous measurement gaps while also scheduling the autonomous measurement gaps earlier in the time domain.

As shown by reference number 420, the UE 120 may determine an autonomous measurement gap for performing the measurement of the neighboring cell. The UE 120 may determine the autonomous measurement gap for performing the measurement of the neighboring cell based at least in part on the timer. For example, the UE 120 may initiate the timer at an end of the on duration of the DRX cycle (e.g., as configured by the DRX cycle configuration). In some aspects, the UE 120 may remain in an active state after the end of the on duration of the DRX cycle (e.g., due to the inactivity timer associated with the DRX cycle). The UE 120 may determine that the autonomous measurement gap for performing the measurement of the neighboring cell is to occur when the timer expires or determine that the autonomous measurement gap for performing the measurement of the neighboring cell is to occur when the UE 120 transitions from an active state associated with the DRX cycle to an inactive state of the DRX cycle. In some aspects, the UE 120 may determine that the autonomous measurement gap for performing the measurement of the neighboring cell is to occur when the timer expires or when the UE 120 transitions from an active state associated with the DRX cycle to an inactive state of the DRX cycle, whichever occurs first in the time domain. The UE 120 may determine that the UE 120 has transitioned from an active state associated with the DRX cycle to an inactive state of the DRX cycle based at least in part on an expiration of the inactivity timer associated with the DRX cycle.

For example, if the UE 120 determines that a duration (e.g., amount of time) of the timer for determining the autonomous measurement gap has expired before the UE 120 has transitioned from an active state associated with the DRX cycle to an inactive state of the DRX cycle, the UE 120 may determine that the autonomous measuring gap may occur while the UE 120 is in the active state of the DRX cycle (e.g., after the duration of timer has expired). If the UE 120 determines that the UE 120 has transitioned from an active state associated with the DRX cycle to an inactive state of the DRX cycle before the duration of the timer has expired, the UE 120 may determine that the autonomous measuring gap may occur before the duration of the timer has expired (e.g., directly or shortly after the UE 120 transitions to the inactive state associated with the DRX cycle).

As shown by reference number 425, the neighboring cell may transmit one or more reference signals (e.g., SSBs, channel state information (CSI) reference signals (CSI-RSs), and/or the like). For example, the second base station 110 of the neighboring cell may broadcast reference signals. The reference signals may be broadcast on one or more transmit beams of the second base station 110.

As shown by reference number 430, the UE 120 may perform a measurement of the neighboring cell during the autonomous measurement gap. For example, the UE 120 may measure a beam transmitted by the second base station 110 associated with the neighboring cell (e.g., using one or more receive beams of the UE 120). The beam may be an SSB beam, a reference signal beam (e.g., a CSI-RS beam and/or the like), and/or the like. The UE 120 may determine a measurement value of the beam of the neighboring cell based at least in part on performing the measurement of the neighboring cell during the autonomous measurement gap. The UE 120 may determine whether to report the measurement value of the beam of the neighboring cell based at least in part on the measurement configuration received from the serving cell.

As a result, the UE 120 may determine that an autonomous measurement gap is to occur as close to an off duration (e.g., an inactive period) of the DRX cycle of the serving cell as possible. The UE 120 may perform measurements of the one or more neighboring cells during the autonomous measurement gap. Determining that the autonomous measurement gap is to occur as close to an off duration (e.g., an inactive period) of the DRX cycle of the serving cell as possible results in improved network performance as degradation of the throughput of the serving cell may be avoided (e.g., as autonomous measurement gaps do not occur during an on duration or an active time associated with the DRX cycle where the UE 120 is receiving communications from the serving cell).

As indicated above, FIG. 4 is provided as an example. Other examples may differ from what is described with respect to FIG. 4.

Figure 5:
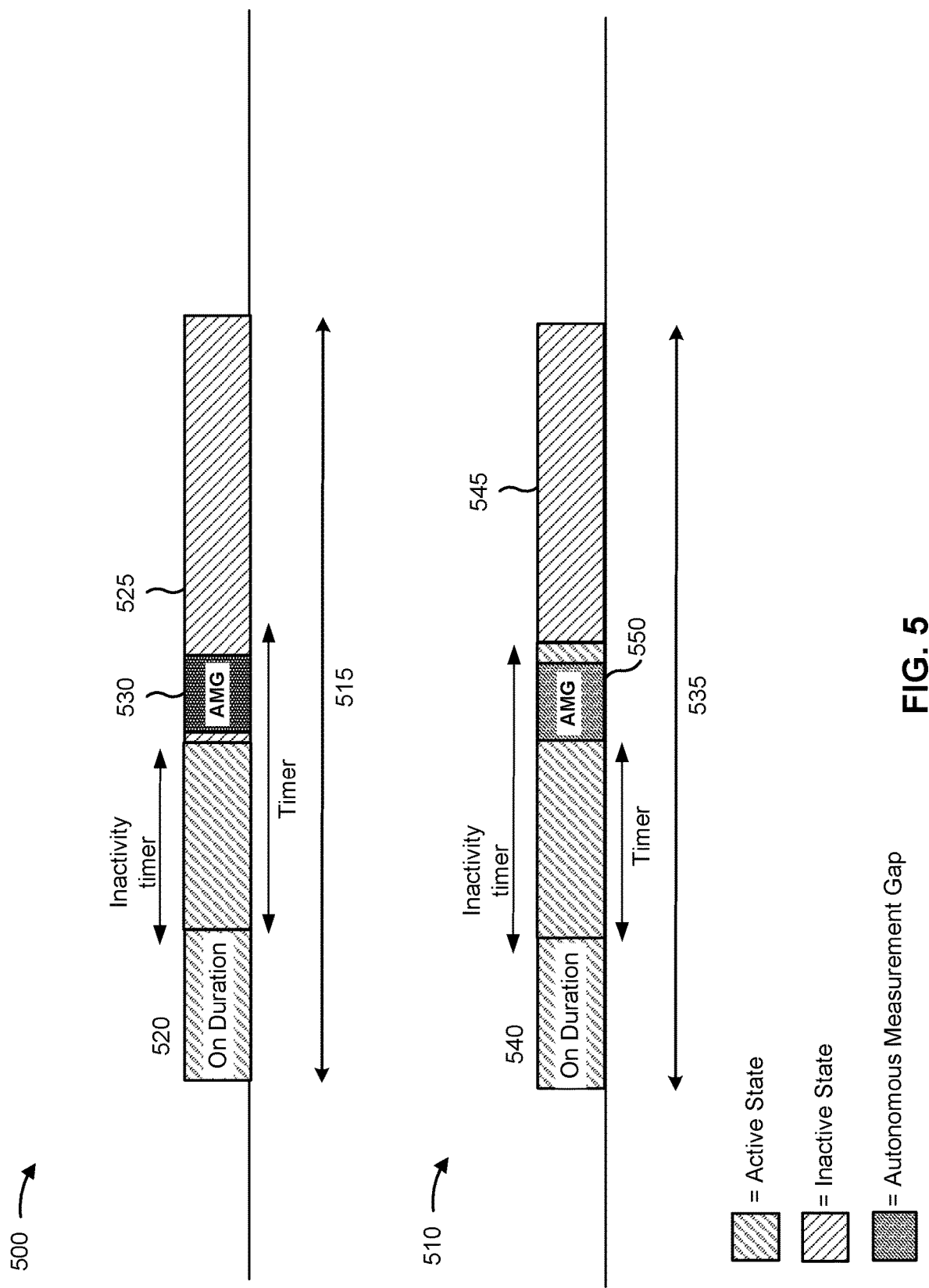

FIG. 5 is a diagram illustrating examples 500 and 510 associated with techniques for DRX cycle based measurement gaps, in accordance with various aspects of the present disclosure. As shown in FIG. 5, a UE 120 may receive a DRX cycle configuration from a base station 110.

As shown in FIG. 5, and example 500, the DRX cycle configuration may configure a DRX cycle 515 for the UE 120. A DRX cycle 515 may include a DRX on duration 520 (e.g., during which a UE 120 is awake or in an active state) and an opportunity to enter a DRX sleep state 525. As used herein, the time during which the UE 120 is configured to be in an active state during the DRX on duration 520 may be referred to as an active time, and the time during which the UE 120 is configured to be in the DRX sleep state 525 may be referred to as an inactive time. As shown in FIG. 5, the active time may be extended after the end of the on duration by an inactivity timer (e.g., if the UE 120 successfully receives and/or decodes a communication intended for the UE 120 during the DRX on duration 520).

The UE 120 may determine that an autonomous measurement gap 530 for performing measurements of one or more neighboring cells is to occur during the DRX cycle 515. The UE 120 may determine the autonomous measurement gap 530 based at least in part on a timer (e.g., the timer for determining the autonomous measurement gap described above with respect to FIG. 4) that is initiated at the end of the DRX on duration 520. The UE 120 may determine an amount of time associated with the timer as described above with respect to FIG. 4. As shown in example 500, the UE 120 may determine that the UE 120 has transitioned from the active state to the inactive state (e.g., enters the DRX sleep state 525 based at least in part on the expiration of the inactivity timer). The UE 120 may determine that the UE 120 has transitioned from the active state to the inactive state before a duration of the timer has expired. As a result, the UE 120 may determine that the autonomous measurement gap 530 may occur directly, or shortly, after the UE 120 enters the DRX sleep state 525 (e.g., before the duration of the timer has expired).

As shown in FIG. 5, and example 510, the DRX cycle configuration may configure a DRX cycle 535 for the UE 120. A DRX cycle 535 may include a DRX on duration 540 (e.g., during which a UE 120 is awake or in an active state) and an opportunity to enter a DRX sleep state 545. As shown in FIG. 5, the active state may be extended after the end of the on duration by an inactivity timer (e.g., if the UE 120 successfully receives and/or decodes a communication intended for the UE 120 during the DRX on duration 540). The DRX cycle 535 may be configured by the same DRX cycle configuration as the DRX cycle 515 or a different DRX cycle configuration.

The UE 120 may determine that an autonomous measurement gap 550 for performing measurements of one or more neighboring cells is to occur during the DRX cycle 535. The UE 120 may determine the autonomous measurement gap 550 based at least in part on a timer (e.g., the timer for determining the autonomous measurement gap described above with respect to FIG. 4) that is initiated at the end of the DRX on duration 540. The UE 120 may determine an amount of time associated with the timer, as described above with respect to FIG. 4. As shown in example 510, the UE 120 may determine that a duration of the timer has expired before a duration of the inactivity time has expired (e.g., the duration of the timer may expire while the UE 120 is in an active state). As a result, the UE 120 may determine that the autonomous measurement gap 550 may occur directly, or shortly, after the duration of the timer expires (e.g., while the UE 120 is in the active state).

As indicated above, FIG. 5 is provided as an example. Other examples may differ from what is described with respect to FIG. 5.

Figure 6:
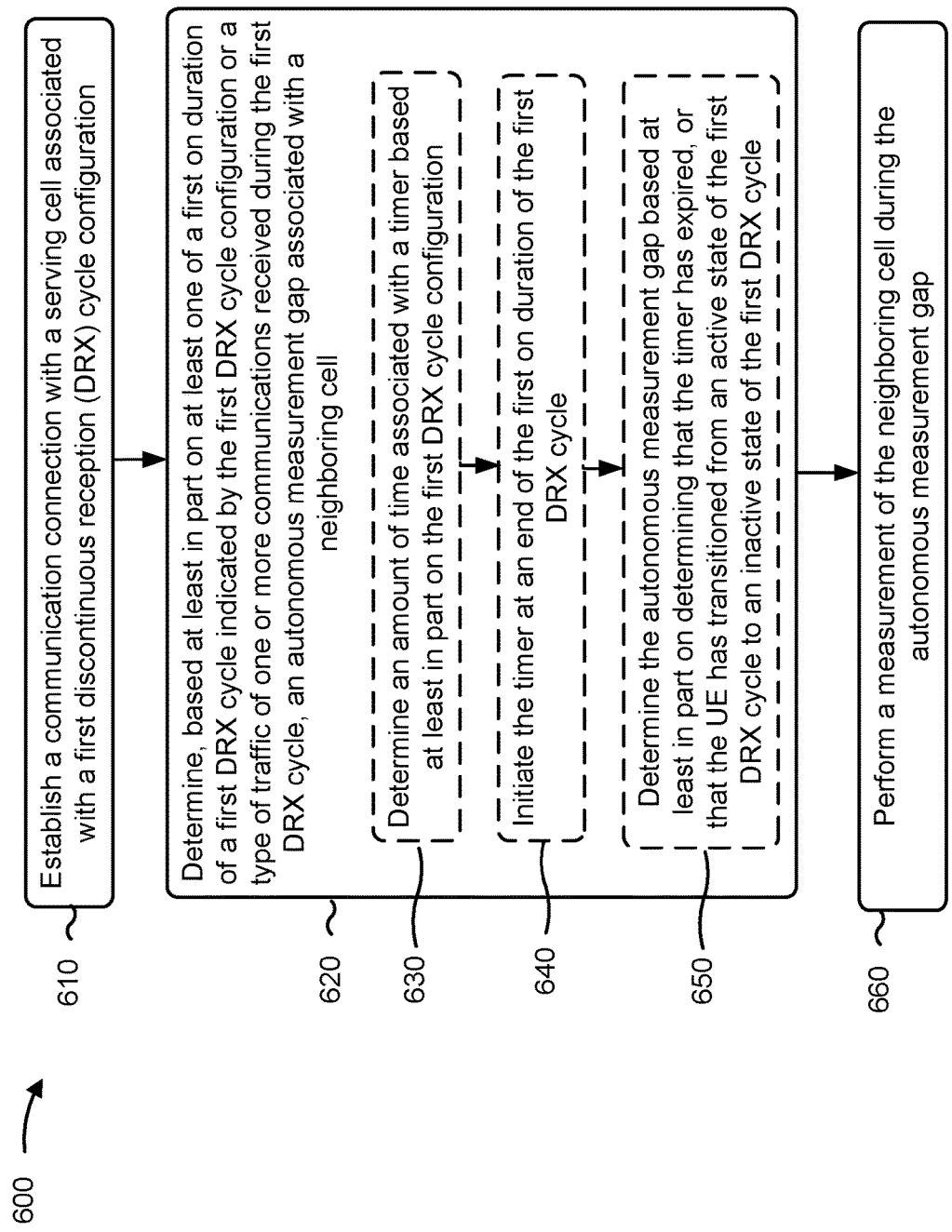
FIG. 6 is a diagram illustrating an example process associated with techniques for DRX cycle based measurement gaps, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with techniques for DRX cycle based measurement gaps.

As shown in FIG. 6, in some aspects, process 600 may include establishing a communication connection with a serving cell associated with a first DRX cycle configuration (block 610). For example, the UE (e.g., using receive processor 258, transmit processor 264, controller/processor 280, memory 282, and/or the like) may establish a communication connection with a serving cell associated with a first DRX cycle configuration, as described above. In some aspects, the UE may include means for establishing a communication connection with a serving cell associated with a first DRX cycle configuration, such as controller/processor 280, memory 282, DEMOD 254, MIMO detector 256, receive processor 258, transmit processor 264, TX MIMO processor 266, MOD 254, antenna 252, and/or the like.

As further shown in FIG. 6, in some aspects, process 600 may include determining, based at least in part on at least one of a first on duration of a first DRX cycle indicated by the first DRX cycle configuration or a type of traffic of one or more communications received during the first DRX cycle, an autonomous measurement gap associated with a neighboring cell (block 620). For example, the UE (e.g., using receive processor 258, transmit processor 264, controller/processor 280, memory 282, and/or the like) may determine, based at least in part on a first on duration of a first DRX cycle indicated by the first DRX cycle configuration, an autonomous measurement gap associated with a neighboring cell, as described above. In some aspects, the UE may include means for determining, based at least in part on a first on duration of a first DRX cycle indicated by the first DRX cycle configuration, an autonomous measurement gap associated with a neighboring cell, such as controller/processor 280, memory 282, DEMOD 254, MIMO detector 256, receive processor 258, transmit processor 264, TX MIMO processor 266, MOD 254, antenna 252, and/or the like.

As further shown in FIG. 6, in some aspects, process 600 may optionally include determining an amount of time associated with a timer based at least in part on the first DRX cycle configuration (block 630). For example, the UE (e.g., using receive processor 258, transmit processor 264, controller/processor 280, memory 282, and/or the like) may determine an amount of time associated with a timer based at least in part on the first DRX cycle configuration. In some aspects, determining, based at least in part on a first on duration of a first DRX cycle indicated by the first DRX cycle configuration, an autonomous measurement gap associated with a neighboring cell may comprise determining an amount of time associated with a timer based at least in part on the first DRX cycle configuration. In some aspects, the UE may include means for determining an amount of time associated with a timer based at least in part on the first DRX cycle configuration, such as controller/processor 280, memory 282, DEMOD 254, MIMO detector 256, receive processor 258, transmit processor 264, TX MIMO processor 266, MOD 254, antenna 252, and/or the like.

As further shown in FIG. 6, in some aspects, process 600 may optionally include initiating the timer at an end of the first on duration of the first DRX cycle (block 640). For example, the UE (e.g., using receive processor 258, transmit processor 264, controller/processor 280, memory 282, and/or the like) may initiate the timer at an end of the first on duration of the first DRX cycle. In some aspects, determining, based at least in part on a first on duration of a first DRX cycle indicated by the first DRX cycle configuration, an autonomous measurement gap associated with a neighboring cell may comprise initiating the timer at an end of the first on duration of the first DRX cycle. In some aspects, the UE may include means for initiating the timer at an end of the first on duration of the first DRX cycle, such as controller/processor 280, memory 282, DEMOD 254, MIMO detector 256, receive processor 258, transmit processor 264, TX MIMO processor 266, MOD 254, antenna 252, and/or the like.

As further shown in FIG. 6, in some aspects, process 600 may optionally include determining the autonomous measurement gap based at least in part on determining that the timer has expired, or the UE has transitioned from an active state of the first DRX cycle to an inactive state of the first DRX cycle (block 650). For example, the UE (e.g., using receive processor 258, transmit processor 264, controller/processor 280, memory 282, and/or the like) may determine the autonomous measurement gap based at least in part on determining that the timer has expired, or the UE has transitioned from an active state of the first DRX cycle to an inactive state of the first DRX cycle. In some aspects, determining, based at least in part on a first on duration of a first DRX cycle indicated by the first DRX cycle configuration, an autonomous measurement gap associated with a neighboring cell may comprise determining the autonomous measurement gap based at least in part on determining that the timer has expired, or the UE has transitioned from an active state of the first DRX cycle to an inactive state of the first DRX cycle. In some aspects, the UE may include at least one of means for determining that the timer has expired, means for determining that the UE has transitioned from an active state of the first DRX cycle to an inactive state of the first DRX cycle, such as controller/processor 280, memory 282, DEMOD 254, MIMO detector 256, receive processor 258, transmit processor 264, TX MIMO processor 266, MOD 254, antenna 252, and/or the like.

As further shown in FIG. 6, in some aspects, process 600 may include performing a measurement of the neighboring cell during the autonomous measurement gap (block 660). For example, the UE (e.g., using receive processor 258, transmit processor 264, controller/processor 280, memory 282, and/or the like) may perform a measurement of the neighboring cell during the autonomous measurement gap, as described above. In some aspects, the UE may include means for performing a measurement of the neighboring cell during the autonomous measurement gap, such as controller/processor 280, memory 282, DEMOD 254, MIMO detector 256, receive processor 258, transmit processor 264, TX MIMO processor 266, MOD 254, antenna 252, and/or the like.

Process 600 may include additional aspects, such as any single aspect or any combination of aspects described below and/or in connection with one or more other processes described elsewhere herein.

In a first aspect, the serving cell includes a first serving cell associated with the first DRX cycle configuration and a second serving cell associated with a second DRX cycle configuration, and determining the autonomous measurement gap associated with the neighboring cell comprises determining, based at least in part on the first on duration of the first DRX cycle indicated by the first DRX cycle configuration and a second on duration of a second DRX cycle indicated by the second DRX cycle configuration, the autonomous measurement gap associated with the neighboring cell. In some aspects, the UE may include means for determining, based at least in part on the first on duration of the first DRX cycle indicated by the first DRX cycle configuration and a second on duration of a second DRX cycle indicated by the second DRX cycle configuration, the autonomous measurement gap associated with the neighboring cell, such as controller/processor 280, memory 282, DEMOD 254, MIMO detector 256, receive processor 258, transmit processor 264, TX MIMO processor 266, MOD 254, antenna 252, and/or the like.

In a second aspect, alone or in combination with the first aspect, the first serving cell is associated with a first radio access technology (RAT) and the second serving cell is associated with a second RAT. In some aspects, the first RAT and the second RAT are different. In other aspects, the first RAT and the second RAT are the same.

In a third aspect, alone or in combination with one or more of the first and second aspects, the serving cell is associated with a first RAT and the neighboring cell is associated with a second RAT. In some aspects, the first RAT and the second RAT are different.

In a fourth aspect, alone or in combination with one or more of the first through third aspects, determining the autonomous measurement gap associated with the neighboring cell comprises initiating a timer at an end of the first on duration of the first DRX cycle, and determining the autonomous measurement gap based at least in part on determining that the timer has expired, or the UE has transitioned from an active state of the first DRX cycle to an inactive state of the first DRX cycle. In some aspects, the UE may include means for initiating a timer at an end of the first on duration of the first DRX cycle, and means for determining the autonomous measurement gap based at least in part on determining that the timer has expired, or the UE has transitioned from an active state of the first DRX cycle to an inactive state of the first DRX cycle, such as controller/processor 280, memory 282, DEMOD 254, MIMO detector 256, receive processor 258, transmit processor 264, TX MIMO processor 266, MOD 254, antenna 252, and/or the like.

In a fifth aspect, alone or in combination with one or more of the first through fourth aspects, process 600 includes determining an amount of time associated with the timer based at least in part on the first DRX cycle configuration. In some aspects, the UE may include means for determining an amount of time associated with the timer based at least in part on the first DRX cycle configuration, such as controller/processor 280, memory 282, DEMOD 254, MIMO detector 256, receive processor 258, transmit processor 264, TX MIMO processor 266, MOD 254, antenna 252, and/or the like.

In a sixth aspect, alone or in combination with one or more of the first through fifth aspects, process 600 includes determining an amount of time associated with the timer based at least in part on at least one of a DRX cycle length indicated by the first DRX cycle configuration, or an inactivity timer indicated by the first DRX cycle configuration. For example, determining an amount of time associated with a timer based at least in part on the first DRX cycle configuration (block 630) may comprise determining an amount of time associated with the timer based at least in part on at least one of a DRX cycle length indicated by the first DRX cycle configuration, or an inactivity timer indicated by the first DRX cycle configuration. In some aspects, the UE may include means for determining an amount of time associated with the timer based at least in part on at least one of a DRX cycle length indicated by the first DRX cycle configuration, or an inactivity timer indicated by the first DRX cycle configuration, such as controller/processor 280, memory 282, DEMOD 254, MIMO detector 256, receive processor 258, transmit processor 264, TX MIMO processor 266, MOD 254, antenna 252, and/or the like.

In a seventh aspect, alone or in combination with one or more of the first through sixth aspects, process 600 includes determining an amount of time associated with the timer based at least in part on the type of traffic of one or more communications received during the first DRX cycle. For example, determining an amount of time associated with a timer based at least in part on the first DRX cycle configuration (block 630) may comprise determining an amount of time associated with the timer based at least in part on the type of traffic of one or more communications received during the first DRX cycle. In some aspects, the UE may include means for determining an amount of time associated with the timer based at least in part on the type of traffic of one or more communications received during the first DRX cycle, such as controller/processor 280, memory 282, DEMOD 254, MIMO detector 256, receive processor 258, transmit processor 264, TX MIMO processor 266, MOD 254, antenna 252, and/or the like.

In an eighth aspect, alone or in combination with one or more of the first through seventh aspects, process 600 includes identifying historical data associated with an amount of time between a start of the on duration of the first DRX cycle and the UE transitioning from the active state of the first DRX cycle to the inactive state of the first DRX cycle; and determining an amount of time associated with the timer based at least in part on the historical data associated with the amount of time between the start of the on duration of the first DRX cycle and the UE transitioning from the active state of the first DRX cycle to the inactive state of the first DRX cycle. For example, determining an amount of time associated with a timer based at least in part on the first DRX cycle configuration (block 630) may comprise identifying historical data associated with an amount of time between a start of the on duration of the first DRX cycle and the UE transitioning from the active state of the first DRX cycle to the inactive state of the first DRX cycle; and determining an amount of time associated with the timer based at least in part on the historical data associated with the amount of time between the start of the on duration of the first DRX cycle and the UE transitioning from the active state of the first DRX cycle to the inactive state of the first DRX cycle. In some aspects, the UE may include means for identifying historical data associated with an amount of time between a start of the on duration of the first DRX cycle and the UE transitioning from the active state of the first DRX cycle to the inactive state of the first DRX cycle, and means for determining an amount of time associated with the timer based at least in part on the historical data associated with the amount of time between the start of the on duration of the first DRX cycle and the UE transitioning from the active state of the first DRX cycle to the inactive state of the first DRX cycle, such as controller/ processor 280, memory 282, DEMOD 254, MIMO detector 256, receive processor 258, transmit processor 264, TX MIMO processor 266, MOD 254, antenna 252, and/or the like.

In a ninth aspect, alone or in combination with one or more of the first through eighth aspects, process 600 includes determining an amount of time associated with the timer; and reducing the amount of time associated with the timer based at least in part on at least one of: determining that a length of the autonomous measurement gap is less than a threshold, determining that a display of the UE is off and one or more communications received during the first DRX cycle are associated with traffic that is delay tolerant, or determining that one or more previous measurements of the neighboring cell satisfy a measurement threshold. For example, determining an amount of time associated with a timer based at least in part on the first DRX cycle configuration (block 630) may comprise determining an amount of time associated with the timer; and reducing the amount of time associated with the timer based at least in part on at least one of: determining that a length of the autonomous measurement gap is less than a threshold, determining that a display of the UE is off and one or more communications received during the first DRX cycle are associated with traffic that is delay tolerant, or determining that one or more previous measurements of the neighboring cell satisfy a measurement threshold. In some aspects, the UE may include means for includes determining an amount of time associated with the timer, and means for reducing the amount of time associated with the timer based at least in part on at least one of: determining that a length of the autonomous measurement gap is less than a threshold, determining that a display of the UE is off and one or more communications received during the first DRX cycle are associated with traffic that is delay tolerant, or determining that one or more previous measurements of the neighboring cell satisfy a measurement threshold, such as controller/ processor 280, memory 282, DEMOD 254, MIMO detector 256, receive processor 258, transmit processor 264, TX MIMO processor 266, MOD 254, antenna 252, and/or the like.

In a tenth aspect, alone or in combination with one or more of the first through ninth aspects, process 600 includes determining an amount of time associated with the timer; and increasing the amount of time associated with the timer based at least in part on at least one of determining that one or more communications received during the first DRX cycle are associated with traffic that is not delay tolerant, determining that the UE is not located within a coverage area associated with the neighboring cell, or determining that previous measurements of the neighboring cell do not satisfy a measurement threshold. For example, determining an amount of time associated with a timer based at least in part on the first DRX cycle configuration (block 630) may comprise determining an amount of time associated with the timer; and increasing the amount of time associated with the timer based at least in part on at least one of determining that one or more communications received during the first DRX cycle are associated with traffic that is not delay tolerant, determining that the UE is not located within a coverage area associated with the neighboring cell, or determining that previous measurements of the neighboring cell do not satisfy a measurement threshold. In some aspects, the UE may include means for determining an amount of time associated with the timer, and means for increasing the amount of time associated with the timer based at least in part on at least one of determining that one or more communications received during the first DRX cycle are associated with traffic that is not delay tolerant, determining that the UE is not located within a coverage area associated with the neighboring cell, or determining that previous measurements of the neighboring cell do not satisfy a measurement threshold, such as controller/processor 280, memory 282, DEMOD 254, MIMO detector 256, receive processor 258, transmit processor 264, TX MIMO processor 266, MOD 254, antenna 252, and/or the like.

In an eleventh aspect, alone or in combination with one or more of the first through tenth aspects, determining the autonomous measurement gap associated with the neighboring cell comprises determining that a plurality of autonomous measurement gaps are to occur during the first DRX cycle, and determining an amount of time associated with the timer based at least in part on the determination that a plurality of autonomous measurement gaps are to occur during the first DRX cycle. For example, determining an amount of time associated with a timer based at least in part on the first DRX cycle configuration (block 630) may comprise determining the autonomous measurement gap associated with the neighboring cell comprises determining that a plurality of autonomous measurement gaps are to occur during the first DRX cycle, and determining an amount of time associated with the timer based at least in part on the determination that a plurality of autonomous measurement gaps are to occur during the first DRX cycle. In some aspects, the UE may include means for determining that a plurality of autonomous measurement gaps are to occur during the first DRX cycle, and means for determining an amount of time associated with the timer based at least in part on the determination that a plurality of autonomous measurement gaps are to occur during the first DRX cycle, such as controller/processor 280, memory 282, DEMOD 254, MIMO detector 256, receive processor 258, transmit processor 264, TX MIMO processor 266, MOD 254, antenna 252, and/or the like.

In a twelfth aspect, alone or in combination with one or more of the first through eleventh aspects, process 600 includes receiving, from the serving cell, a second DRX cycle configuration, wherein determining the autonomous measurement gap associated with the neighboring cell comprises determining an amount of time associated with the timer based at least in part on at least one of the first DRX cycle configuration, the second DRX cycle configuration, or a combination thereof. For example, determining an amount of time associated with a timer based at least in part on the first DRX cycle configuration (block 630) may comprise receiving, from the serving cell, a second DRX cycle configuration, wherein determining the autonomous measurement gap associated with the neighboring cell comprises determining an amount of time associated with the timer based at least in part on at least one of the first DRX cycle configuration, the second DRX cycle configuration, or a combination thereof. In some aspects, the UE may include means for receiving, from the serving cell, a second DRX cycle configuration, and means for determining an amount of time associated with the timer based at least in part on at least one of the first DRX cycle configuration, the second DRX cycle configuration, or a combination thereof, such as controller/processor 280, memory 282, DEMOD 254, MIMO detector 256, receive processor 258, transmit processor 264, TX MIMO processor 266, MOD 254, antenna 252, and/or the like.

In a thirteenth aspect, alone or in combination with one or more of the first through twelfth aspects, the first DRX cycle configuration is associated with a first RAT and the second DRX cycle configuration is associated with a second RAT. In some aspects, the first RAT and the second RAT are different. In other aspects, the first RAT and the second RAT are the same.

In a fourteenth aspect, alone or in combination with one or more of the first through thirteenth aspects, process 600 includes determining that a communication received during the first DRX cycle is associated with traffic that is not delay tolerant, wherein determining the autonomous measurement gap associated with the neighboring cell comprises determining that the autonomous measurement gap associated with the neighboring cell is to occur during an inactive state of the first DRX cycle. In some aspects, the UE may include means for determining that a communication received during the first DRX cycle is associated with traffic that is not delay tolerant, and means for determining that the autonomous measurement gap associated with the neighboring cell is to occur during an inactive state of the first DRX cycle, such as controller/processor 280, memory 282, DEMOD 254, MIMO detector 256, receive processor 258, transmit processor 264, TX MIMO processor 266, MOD 254, antenna 252, and/or the like.

In a fifteenth aspect, alone or in combination with one or more of the first through fourteenth aspects, process 600 includes determining that a communication received during the first DRX cycle is associated with traffic that is not delay tolerant; and determining that a communication associated with traffic that is not delay tolerant is not to be received until a next DRX cycle, wherein determining the autonomous measurement gap associated with the neighboring cell comprises determining that the autonomous measurement gap associated with the neighboring cell is to occur after the communication received during the first DRX cycle that is associated with traffic that is not delay tolerant. In some aspects, the UE may include means for determining that a communication received during the first DRX cycle is associated with traffic that is not delay tolerant, means for determining that a communication associated with traffic that is not delay tolerant is not to be received until a next DRX cycle, and means for determining that the autonomous measurement gap associated with the neighboring cell is to occur after the communication received during the first DRX cycle that is associated with traffic that is not delay tolerant, such as controller/processor 280, memory 282, DEMOD 254, MIMO detector 256, receive processor 258, transmit processor 264, TX MIMO processor 266, MOD 254, antenna 252, and/or the like.

In a sixteenth aspect, alone or in combination with one or more of the first through fifteenth aspects, determining that a communication associated with traffic that is not delay tolerant is not to be received until a next DRX cycle comprises identifying historical data associated with receiving communications associated with traffic that is not delay tolerant, and determining an average amount of time between receiving communications associated with traffic that is not delay tolerant. In some aspects, the UE may include means for identifying historical data associated with receiving communications associated with traffic that is not delay tolerant, and means for determining an average amount of time between receiving communications associated with traffic that is not delay tolerant, such as controller/processor 280, memory 282, DEMOD 254, MIMO detector 256, receive processor 258, transmit processor 264, TX MIMO processor 266, MOD 254, antenna 252, and/or the like.

In a seventeenth aspect, alone or in combination with one or more of the first through sixteenth aspects, the traffic that is not delay tolerant is at least one of voice traffic, streaming traffic, gaming traffic, extended reality traffic, or virtual reality traffic.

In an eighteenth aspect, alone or in combination with one or more of the first through seventeenth aspects, the UE is operating in at least one of: a Long Term Evolution (LTE) mode, an Evolved Universal Mobile Telecommunications System Terrestrial Radio Access-New Radio (NR) dual connectivity mode, an NR standalone mode, or an NR dual connectivity mode.

In a nineteenth aspect, alone or in combination with one or more of the first through eighteenth aspects, process 600 includes receiving, from the serving cell, a measurement configuration indicating a measurement frequency; and determining that the neighboring cell is operating using the measurement frequency. In some aspects, the UE may include means for receiving, from the serving cell, a measurement configuration indicating a measurement frequency, and means for determining that the neighboring cell is operating using the measurement frequency, such as controller/processor 280, memory 282, DEMOD 254, MIMO detector 256, receive processor 258, transmit processor 264, TX MIMO processor 266, MOD 254, antenna 252, and/or the like.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
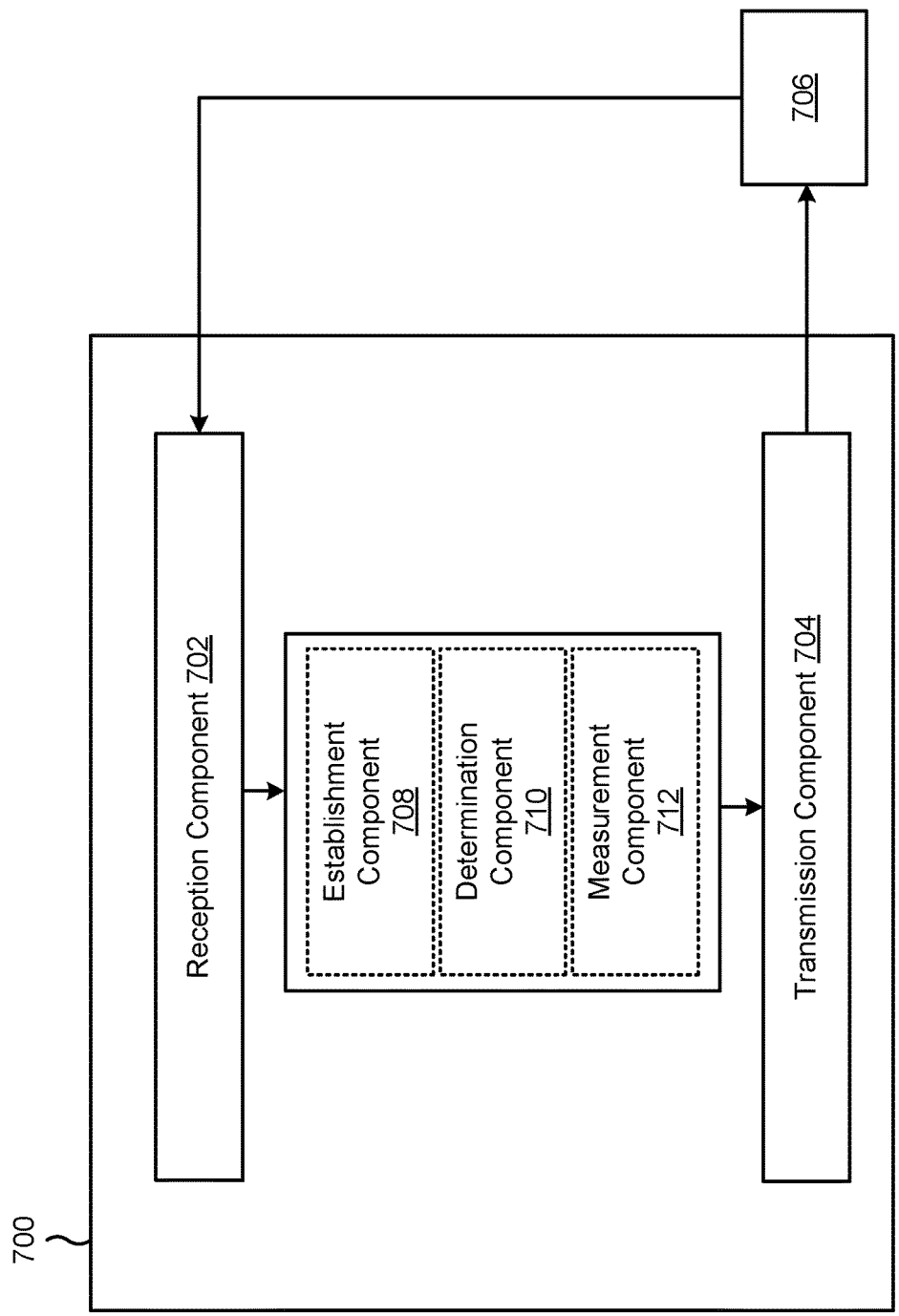
FIG. 7 is a block diagram of an example apparatus for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of an establishment component 708, a determination component 710, or a measurement component 712, among other examples.

In some aspects, the apparatus 700 may be configured to perform one or more operations described herein in connection with FIGS. 4-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the user equipment described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the user equipment described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the user equipment described above in connection with FIG. 2. In some aspects, the transmission component 704 may be co-located with the reception component 702 in a transceiver.

The establishment component 708 may establish a communication connection with a serving cell associated with a first discontinuous reception (DRX) cycle configuration. The establishment component 708 may include antenna 252, DEMOD 254, MIMO detector 256, transmit processor 264, TX MIMO processor 266, receive processor 258, controller/processor 280, and/or the like.

The determination component 710 may determine, based at least in part on at least one of a first on duration of a first DRX cycle indicated by the first DRX cycle configuration or a type of traffic of one or more communications received during the first DRX cycle, an autonomous measurement gap associated with a neighboring cell. The determination component may include antenna 252, DEMOD 254, MIMO detector 256, transmit processor 264, TX MIMO processor 266, receive processor 258, controller/processor 280, and/or the like.

The measurement component 712 may perform a measurement of the neighboring cell during the autonomous measurement gap. The measurement component 712 may include antenna 252, DEMOD 254, MIMO detector 256, transmit processor 264, TX MIMO processor 266, receive processor 258, controller/processor 280, and/or the like.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of aspects of the present disclosure:

Aspect 1: A method of wireless communication performed by a UE, comprising: establishing a communication connection with a serving cell associated with a first DRX cycle configuration; determining, based at least in part on at least one of a first on duration of a first DRX cycle indicated by the first DRX cycle configuration or a type of traffic of one or more communications received during the first DRX cycle, an autonomous measurement gap associated with a neighboring cell; and performing a measurement of the neighboring cell during the autonomous measurement gap.

Aspect 2: The method of aspect 1, wherein the serving cell includes a first serving cell associated with the first DRX cycle configuration and a second serving cell associated with a second DRX cycle configuration, and wherein determining the autonomous measurement gap associated with the neighboring cell comprises: determining, based at least in part on the first on duration of the first DRX cycle indicated by the first DRX cycle configuration and a second on duration of a second DRX cycle indicated by the second DRX cycle configuration, the autonomous measurement gap associated with the neighboring cell.

Aspect 3: The method of aspect 2, wherein the first serving cell is associated with a first RAT and the second serving cell is associated with a second RAT.

Aspect 4: The method of any of aspects 1 through 3, wherein the serving cell is associated with a first RAT and the neighboring cell is associated with a second RAT.

Aspect 5: The method of any of aspects 1 through 4, wherein determining the autonomous measurement gap associated with the neighboring cell comprises: initiating a timer at an end of the first on duration of the first DRX cycle; and determining the autonomous measurement gap based at least in part on determining that: the timer has expired, or the UE has transitioned from an active state of the first DRX cycle to an inactive state of the first DRX cycle.

Aspect 6: The method of aspect 5, further comprising: determining an amount of time associated with the timer based at least in part on the first DRX cycle configuration.

Aspect 7: The method of any of aspects 5 through 6, further comprising: determining the amount of time associated with the timer based at least in part on at least one of:

a DRX cycle length indicated by the first DRX cycle configuration, or an inactivity timer indicated by the first DRX cycle configuration.

Aspect 8: The method of any of aspects 5 through 7, further comprising: determining the amount of time associated with the timer based at least in part on the type of traffic of one or more communications received during the first DRX cycle.

Aspect 9: The method of any of aspects 5 through 8, further comprising: identifying historical data associated with an amount of time between a start of the on duration of the first DRX cycle and the UE transitioning from the active state of the first DRX cycle to the inactive state of the first DRX cycle; and determining the amount of time associated with the timer based at least in part on the historical data associated with the amount of time between the start of the on duration of the first DRX cycle and the UE transitioning from the active state of the first DRX cycle to the inactive state of the first DRX cycle.

Aspect 10: The method of any of aspects 5 through 9, further comprising: determining the amount of time associated with the timer; and reducing the amount of time associated with the timer based at least in part on at least one of: determining that a length of the autonomous measurement gap is less than a threshold, determining that a display of the UE is off and one or more communications received during the first DRX cycle are associated with traffic that is delay tolerant, or determining that one or more previous measurements of the neighboring cell satisfy a measurement threshold.

Aspect 11: The method of any of aspects 5 through 9, further comprising: determining the amount of time associated with the timer; and increasing the amount of time associated with the timer based at least in part on at least one of: determining that one or more communications received during the first DRX cycle are associated with traffic that is not delay tolerant, determining that the UE is not located within a coverage area associated with the neighboring cell, or determining that previous measurements of the neighboring cell do not satisfy a measurement threshold.

Aspect 12: The method of any of aspects 5 through 11, wherein determining the autonomous measurement gap associated with the neighboring cell comprises: determining that a plurality of autonomous measurement gaps are to occur during the first DRX cycle; and determining the amount of time associated with the timer based at least in part on the determination that a plurality of autonomous measurement gaps are to occur during the first DRX cycle.

Aspect 13: The method of any of aspects 5 through 12, further comprising: receiving, from the serving cell, a second DRX cycle configuration, wherein determining the autonomous measurement gap associated with the neighboring cell comprises: determining the amount of time associated with the timer based at least in part on at least one of: the first DRX cycle configuration, the second DRX cycle configuration, or a combination thereof.

Aspect 14: The method of aspect 13, wherein the first DRX cycle configuration is associated with a first RAT and the second DRX cycle configuration is associated with a second RAT.

Aspect 15: The method of any of aspects 1 through 14, further comprising: determining that a communication received during the first DRX cycle is associated with traffic that is not delay tolerant, wherein determining the autonomous measurement gap associated with the neighboring cell comprises: determining that the autonomous measurement gap associated with the neighboring cell is to occur during an inactive state of the first DRX cycle.

Aspect 16: The method of any of aspects 1 through 15, further comprising: determining that a communication received during the first DRX cycle is associated with traffic that is not delay tolerant; and determining that a communication associated with traffic that is not delay tolerant is not to be received until a next DRX cycle, wherein determining the autonomous measurement gap associated with the neighboring cell comprises: determining that the autonomous measurement gap associated with the neighboring cell is to occur after the communication received during the first DRX cycle that is associated with traffic that is not delay tolerant.

Aspect 17: The method of aspect 16, wherein determining that a communication associated with traffic that is not delay tolerant is not to be received until a next DRX cycle comprises: identifying historical data associated with receiving communications associated with traffic that is not delay tolerant; and determining an average amount of time between receiving communications associated with traffic that is not delay tolerant.

Aspect 18: The method of any of aspects 11, or 15 through 17, wherein the traffic that is not delay tolerant is at least one of: voice traffic, streaming traffic, gaming traffic, extended reality traffic, or virtual reality traffic.

Aspect 19: The method of any of aspects 1 through 18, wherein the UE is operating in at least one of: an LTE mode, an ENDC mode, an NR standalone mode, or an NR dual connectivity mode.

Aspect 20: The method of any of aspects 1 through 19, further comprising: receiving, from the serving cell, a measurement configuration indicating a measurement frequency; and determining that the neighboring cell is operating using the measurement frequency.

Aspect 21: A UE for wireless communication, comprising a memory and one or more processors coupled to the memory, the memory and the one or more processors configured to perform a method of any of aspects 1 through 20.

Aspect 22: A non-transitory computer-readable medium storing a set of instructions for wireless communication, the set of instructions comprising one or more instructions that, when executed by one or more processors of a UE, cause the UE to perform a method of any of aspects 1 through 20.

Aspect 23: An apparatus for wireless communication, comprising at least one means for performing a method of any of aspects 1 through 20.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        determine an amount of time for a timer used for an autonomous measurement gap associated with a neighboring cell,
            the autonomous measurement gap being autonomously determined by the UE;
        initiate the timer;
        determine that the autonomous measurement gap is to occur based at least in part on determining that the amount of time for the timer has expired; and
        perform a measurement of the neighboring cell during the autonomous measurement gap.

2. The UE of claim 1, wherein, to determine the amount of time for the timer, the one or more processors are configured to:
    determine the amount of time for the timer based on a point in time during which the UE typically enters an inactive state.

3. The UE of claim 2, wherein the one or more processors are further configured to:
    identify historical data associated with the UE; and
    determine, based on the historical data, the point in time during which the UE typically enters the inactive state.

4. The UE of claim 3, wherein, to determine the point in time during which the UE typically enters the inactive state, the one or more processors are configured to:
    determine the point in time during which the UE typically enters the inactive state by utilizing a machine learning model to analyze the historical data.

5. The UE of claim 1, wherein, to initiate the timer, the one or more processors are configured to:
    initiate the timer at an end of a discontinuous reception (DRX) cycle.

6. The UE of claim 1, wherein, to determine that the autonomous measurement gap is to occur, the one or more processors are configured to:
    determine that the amount of time for the timer has expired before the UE has transitioned from an active state of a discontinuous reception (DRX) cycle to an inactive state of the DRX cycle; and
    determine, based on determining that the amount of time for the timer has expired before the UE has transitioned from the active state of the DRX cycle to the inactive state of the DRX cycle, that the autonomous measurement gap is to occur while the UE is in the active state of the DRX cycle.

7. The UE of claim 6, wherein the UE is in the active state of the DRX cycle after the amount of time for the timer has expired.

8. The UE of claim 1, wherein, to determine that the autonomous measurement gap is to occur, the one or more processors are configured to:
    determine that the UE has transitioned from an active state of a discontinuous reception (DRX) cycle to an inactive state of the DRX cycle before the amount of time for the timer has expired; and
    determine that the autonomous measurement gap is to occur before the amount of time for the timer has expired.

9. The UE of claim 1, wherein, to perform the measurement of the neighboring cell, the one or more processors are configured to:
    measure, during the autonomous measurement gap, a beam transmitted by a base station associated with the neighboring cell.

10. The UE of claim 9, wherein, to measure the beam transmitted by the base station, the one or more processors are configured to:
    measure, during the autonomous measurement gap and using one or more receive beams of the UE, the beam transmitted by the base station.

11. The UE of claim 9, wherein the beam is one of:
    a synchronization signal block (SSB) beam, or
    a channel state information (CSI) reference signals (CSI-RSs) beam.

12. A method of wireless communication performed by a user equipment (UE), comprising:
    determining an amount of time for a timer used for an autonomous measurement gap associated with a neighboring cell,
        the autonomous measurement gap being autonomously determined by the UE;
    initiating the timer;

determining that the autonomous measurement gap is to occur based at least in part on determining that the amount of time for the timer has expired; and performing a measurement of the neighboring cell during the autonomous measurement gap.

13. The method of claim 12, wherein determining the amount of time for the timer comprises:

determining the amount of time for the timer based on a point in time during which the UE typically enters an inactive state.

14. The method of claim 12, wherein initiating the timer comprises:

initiating the timer at an end of a discontinuous reception (DRX) cycle.

15. The method of claim 12, wherein determining that the autonomous measurement gap is to occur comprises:

determining that the amount of time for the timer has expired before the UE has transitioned from an active state of a discontinuous reception (DRX) cycle to an inactive state of the DRX cycle; and determining, based on determining that the amount of time for the timer has expired before the UE has transitioned from the active state of the DRX cycle to the inactive state of the DRX cycle, that the autonomous measurement gap is to occur while the UE is in the active state of the DRX cycle.

16. The method of claim 15, wherein the UE is in the active state of the DRX cycle after the amount of time for the timer has expired.

17. The method of claim 12, wherein determining that the autonomous measurement gap is to occur comprises:

determining that the UE has transitioned from an active state of a discontinuous reception (DRX) cycle to an inactive state of the DRX cycle before the amount of time for the timer has expired; and determining that the autonomous measurement gap is to occur before the amount of time for the timer has expired.

18. A non-transitory computer-readable medium storing a set of instructions for wireless communication, the set of instructions comprising:

one or more instructions that, when executed by one or more processors of a user equipment (UE), cause the UE to:

determine an amount of time for a timer used for an autonomous measurement gap associated with a neighboring cell,
the autonomous measurement gap being autonomously determined by the UE;

initiate the timer;

determine that the autonomous measurement gap is to occur based at least in part on determining that the amount of time for the timer has expired; and perform a measurement of the neighboring cell during the autonomous measurement gap.

19. The non-transitory computer-readable medium of claim 18, wherein the amount of time for the timer is based on a point in time during which the UE typically enters an inactive state.

20. The non-transitory computer-readable medium of claim 18, wherein the timer is initiated at an end of a discontinuous reception (DRX) cycle.

* * * * *